US011397672B2

(12) United States Patent
Ju et al.

(10) Patent No.: US 11,397,672 B2
(45) Date of Patent: Jul. 26, 2022

(54) DEALLOCATING COMMAND PROCESSING METHOD AND STORAGE DEVICE HAVING MULTIPLE CPUS THEREOF

(71) Applicant: BEIJING MEMBLAZE TECHNOLOGY CO., LTD, Beijing (CN)

(72) Inventors: Yingyi Ju, Beijing (CN); Rong Yuan, Beijing (CN); Baoyong Sun, Beijing (CN); Zhihong Guo, Beijing (CN); Huijuan Gao, Beijing (CN); Shunan Cai, Beijing (CN)

(73) Assignee: BEIJING MEMBLAZE TECHNOLOGY CO., LTD, Beijing (CN)

( * ) Notice: Subject to any disclaimer, the term of this patent is extended or adjusted under 35 U.S.C. 154(b) by 133 days.

(21) Appl. No.: 17/044,457

(22) PCT Filed: Jun. 28, 2018

(86) PCT No.: PCT/CN2018/093483
§ 371 (c)(1),
(2) Date: Dec. 18, 2020

(87) PCT Pub. No.: WO2019/105029
PCT Pub. Date: Jun. 6, 2019

(65) Prior Publication Data
US 2021/0103518 A1 Apr. 8, 2021

(30) Foreign Application Priority Data

Nov. 29, 2017 (CN) .......................... 201711222238.9
Jun. 11, 2018 (CN) .......................... 201810594487.9

(51) Int. Cl.
*G06F 12/02* (2006.01)
*G06F 9/38* (2018.01)
*G06F 9/50* (2006.01)

(52) U.S. Cl.
CPC ........ *G06F 12/0246* (2013.01); *G06F 9/3885* (2013.01); *G06F 9/5016* (2013.01);
(Continued)

(58) Field of Classification Search
CPC .. G06F 12/0246; G06F 9/3885; G06F 9/5016; G06F 9/5022; G06F 12/0253;
(Continued)

(56) References Cited

U.S. PATENT DOCUMENTS 4,403,283 A * 9/1983 Myntti ................ G06F 12/0292
711/2
6,477,612 B1 * 11/2002 Wang .................. G06F 12/1009
711/2

(Continued)

FOREIGN PATENT DOCUMENTS

CN        103019971 A        4/2013
CN        103914409 A        7/2014
(Continued)

OTHER PUBLICATIONS

International Search Report issued in corresponding International Application No. PCT/CN2018/093483, dated Sep. 27, 2018; 5 pgs.
(Continued)

*Primary Examiner* — Tasnima Matin
(74) *Attorney, Agent, or Firm* — Hauptman Ham, LLP

(57) ABSTRACT

The present application discloses a method for processing a deallocation command and a storage device thereof. The disclosed method includes the following steps: in response to receiving the deallocation command, obtaining an address range indicated by the deallocation command; and updating (Continued)

the table items of the deallocation table according to the address range indicated by the deallocation command. Embodiments of the present application can reduce the delay in processing the deallocation command and reduce the impact of processing the deallocation command on the processing bandwidth of the IO command.

10 Claims, 16 Drawing Sheets

(52) U.S. Cl.
CPC ........ *G06F 9/5022* (2013.01); *G06F 12/0253* (2013.01); *G06F 12/0292* (2013.01); *G06F 2212/7201* (2013.01)

(58) Field of Classification Search
CPC ......... G06F 12/0292; G06F 2212/7201; G06F 2212/1044; G06F 3/06
See application file for complete search history.

(56) References Cited

U.S. PATENT DOCUMENTS

| | | | | |
|---|---|---|---|---|
| 9,652,315 B1* | 5/2017 | Aquino | ............... | G11C 29/42 |
| 2002/0016878 A1* | 2/2002 | Flores | ............... | G06F 8/457 |
| | | | | 710/200 |
| 2003/0212883 A1* | 11/2003 | Lee | ............... | G06F 9/5077 |
| | | | | 713/1 |
| 2004/0139284 A1* | 7/2004 | Clayton | ............... | G06F 9/5016 |
| | | | | 711/147 |
| 2006/0069849 A1* | 3/2006 | Rudelic | ............... | G06F 12/0246 |
| | | | | 711/103 |
| 2011/0173155 A1* | 7/2011 | Becchi | ............... | G06F 9/5044 |
| | | | | 707/610 |
| 2012/0311237 A1* | 12/2012 | Park | ............... | G06F 12/0246 |
| | | | | 711/103 |
| 2013/0132650 A1* | 5/2013 | Choi | ............... | G06F 12/0246 |
| | | | | 711/103 |
| 2013/0275660 A1 | 10/2013 | Bennett | | |
| 2015/0220282 A1* | 8/2015 | Tsuda | ............... | G06F 3/0613 |
| | | | | 711/114 |

FOREIGN PATENT DOCUMENTS

| | | | |
|---|---|---|---|
| CN | 107003942 A | 8/2017 | |
| CN | 109426436 A | 3/2019 | |

OTHER PUBLICATIONS

Written Opinion issued in corresponding International Application No. PCT/CN2018/093483, dated Sep. 27, 2018; 9 pgs.

* cited by examiner

FTL table

| LBA 0 | PBA 1-4 |
|---|---|
| LBA 1 | PBA 3-6 |
| LBA 2 | PBA 1-9 |
| LBA 3 | PBA 1-10 |
| LBA 4 | PBA 3-15 |
| LBA 5 | PBA 3-13 |
| LBA 6 | PBA 3-3 |
| LBA 7 | PBA 1-15 |

FIG. 3A

| LBA 0 | 0 |
|---|---|
| LBA 1 | 0 |
| LBA 2 | 0 |
| LBA 3 | 0 |
| LBA 4 | PPA 3-15 |
| LBA 5 | PPA 3-13 |
| LBA 6 | PPA 3-3 |
| LBA 7 | PPA 1-15 |

FIG. 3B

Deallocation table

| LBA 0 | 0 |
|---|---|
| LBA 1 | 0 |
| LBA 2 | 0 |
| LBA 3 | 0 |
| LBA 4 | 0 |
| LBA 5 | 0 |
| LBA 6 | 0 |
| LBA 7 | 0 |

FIG. 4A

DEALLOCATING COMMAND PROCESSING METHOD AND STORAGE DEVICE HAVING MULTIPLE CPUS THEREOF

CROSS REFERENCE TO RELATED APPLICATIONS

The present application is a National Phase of International Application Number PCT/CN2018/093483 filed Jun. 28, 2018 and claims priority to Chinese Patent Application No. 2017112222389 (entitled "METHOD FOR PROCESSING STORAGE COMMAND AND STORAGE DEVICE THEREOF") filed on Nov. 29, 2017 and Chinese Patent Application No. 2018105944879 (entitled "METHOD FOR PROCESSING DEALLOCATION COMMAND AND STORAGE DEVICE THEREOF") filed on Jun. 11, 2018, which is incorporated herein by reference in its entirety.

TECHNICAL FIELD

The present application relates to the technical field of storage, and in particular, to a method for processing a deallocation command and a storage device thereof.

BACKGROUND

FIG. 1 shows a block diagram of a solid-state storage device. The solid-state storage device 102 is coupled with a host to provide storage capabilities for the host. The host and the solid-state storage device 102 can be coupled with each other in a variety of ways, including, but not limited to, connecting the host to the solid-state storage device 102 through, for example, a Serial Advanced Technology Attachment (SATA), a Small Computer System Interface (SCSI), a Serial Attached SCSI (SAS), Integrated Drive Electronics (IDE), a Universal Serial Bus (USB), Peripheral Component Interconnect Express (PCIE), Non-Volatile Memory Express (NVMe), Ethernet, a fiber channel, a wireless communication network, and the like. The host may be an information-processing device capable of communicating with the storage device in the above-mentioned ways, such as, a personal computer, a tablet computer, a server, a portable computer, a network switch, a router, a cellular phone, and a personal digital assistant. The storage device 102 includes an interface 103, a control component 104, one or more NVM chips 105, and a Dynamic Random Access Memory (DRAM) 110.

NAND flash memory, phase change memory, Ferroelectric RAM (FeRAM), Magnetic Random Access Memory (MRAM), Resistive Random Access Memory (RRAM), etc. are common NVMs.

The interface 103 can be adapted to exchange data with the host by means of, for example, SATA, IDE, USB, PCIE, NVMe, SAS, Ethernet, the fiber channel and the like.

The control component 104 is configured to control data transmission among the interface 103, the NVM chip 105 and the DRAM 110, and is further configured for storage management, mapping from a logical address of the host to a physical address of the flash memory, erasure leveling, bad block management, and the like. The control component 104 can be implemented in multiple ways such as software, hardware, firmware, or a combination thereof. For example, the control component 104 may be a Field-Programmable Gate Array (FPGA), an Application Specific Integrated Circuit (ASIC), or a combination thereof. The control component 104 may also include a processor or a controller, and the software is executed in the processor or controller to manipulate the hardware of the control component 104 to process Input/Output (IO) commands. The control unit 104 may also be coupled to the DRAM 110 and can access data of the DRAM 110. The DRAM may store a Flash Translation Layer (FTL) table and/or buffered data of the IO commands.

The control component 104 includes a flash memory interface controller (or called a medium interface controller or a flash memory channel controller). The flash memory interface controller is coupled to the NVM chip 105, and sends a command to the NVM chip 105 by means of following the interface protocol of the NVM chip 105 to operate the NVM chip 105 and receive the command execution result output from the NVM chip 105. Known NVM chip interface protocols include "Toggle", "ONFI", and the like.

A memory target is one or more logic units (LUN, Logic Unit) sharing a Chip Enable (CE) signal in a NAND flash memory package. The NAND flash memory package may include one or more dies. Typically, the logic unit corresponds to a single die. The logic unit may include multiple planes. The multiple planes in the logic unit can be accessed in parallel, and the multiple logic units in the NAND flash memory chip can execute commands and report states independently of each other.

Data is usually stored and read on the storage medium in pages. However, the data is erased in blocks. A block (also called a physical block) includes multiple pages. The block includes multiple pages. The pages (called physical pages) on the storage medium have a fixed size, for example, 17,664 bytes. The physical pages may also have other sizes.

A chunk includes physical blocks from multiple logic units (LUN), also called a logic unit group. Each logic unit may provide one physical block for the chunk. For example, in a schematic diagram of a chunk shown in FIG. 2, every 16 logic units (LUN) constitute a chunk. Each chunk includes 16 physical units respectively coming from 16 logic units (LUN). In the example of FIG. 2, chunk 0 includes physical block 0 coming from each of 16 logic units (LUN), and chunk 1 includes physical block 1 from each logic unit (LUN). The chunk can also be constructed in many other ways.

For example, page stripes are constructed in a chunk, and physical pages having the same physical address in logic units (LUN) are constructed as a "page stripe". In FIG. 2, physical page P0-0, physical page P0-1 . . . , and physical page P0-x constitute page stripe 0, wherein physical page P0-0, physical page P0-1 . . . , and physical page P0-14 are used for store user data, and physical page P0-x is used for storing verification data calculated according to all user data in the stripe. Similarly, in FIG. 2, physical page P2-0, physical page P2-1 . . . , and physical page P2-x constitute page stripe 2. The physical page for storing verification data may be located at any position in a page stripe. As another example, FIG. 3A of Chinese Patent Application NO. 201710752321.0 and related descriptions for FIG. 3A in the description thereof provide another construction approach of the chunk.

In the solid-state storage device, an FTL is used to maintain mapping information from a logical address to a physical address. The logical address constitutes a storage space of the solid-state storage device as perceived by upper-layer software such as an operating system. The physical address is an address used for accessing a physical storage unit of the solid-state storage device. In the related art, an intermediate address form can also be used to implement address mapping. For example, the logical address is mapped to the intermediate address, and then the intermediate address is further mapped to the physical address.

A table structure which stores the mapping information from the logical address to the physical address is called an FTL table. The FTL table is important metadata in the solid-state storage device. Data items of the FTL table record address mapping relations in the unit of data units in the solid-state storage device. In one example, a logical page in the FTL table corresponds to a 4 KB storage space, and the storage space of the physical page is also 4 KB (further including an additional out-of-stripe storage space). The FTL table provides one record for each 4 KB data unit, so as to record mapping thereof from the logical address to the physical address. In another example, the size of the storage space corresponding to the data unit and the size of the storage space of the physical page are different. For example, the physical page can accommodate multiple data units, the data unit corresponds to the 4 KB storage space, and the storage space of the physical page can accommodate multiple (such as 4) data units.

The FTL table includes multiple FTL table entries (or called table items). In one case, each FTL table entry records the correspondence between one logical page address and one physical page. In another case, each FTL table entry records the correspondence between multiple consecutive logical page addresses and multiple consecutive physical pages. In yet another case, each FTL table entry records the correspondence between the logical block address and the physical block address. In still another case, the FTL table records the mapping relation between the logical block address and the physical block address, and/or the mapping relation between the logical page address and the physical page address.

When processing a read command from the host, the solid-state storage device uses the logical address carried in the read command to obtain the corresponding physical address from the FTL table, sends a read request to the NVM chip according to the physical address, and receives data output by the NVM chip in response to the read request. When processing a write command from the host, the solid-state storage device allocates a physical address for the write command, records the correspondence between the logical address of the write command and the allocated physical address in the FTL table, and sends a write request to the NVM chip according to the allocated physical address.

A "Trim" command is defined in ATA8-ACS2. Commands having the same or similar meanings are called "UNMAP" in the SCSI standard, and called "Deallocate" in the NVMe standard. In the text below, "deallocate" is used to indicate data set management commands having the same or similar functions as "trim" of ATA8-A CS2, "UNMAP" of SCSI, and "deallocate" of NVMe, and also used to indicate commands having the same or similar functions that appear in other or future protocols, standards or technologies.

In a deallocation command, a logical address range is described. The execution of the deallocation command may yield different effects. For example, (1) after the deallocation command is executed, (before other write operations for the logical address range are executed) when the logical address range indicated by the deallocation command is read, the result obtained may be definite; (2) after the deallocation command is executed, (before other write operations for the logical address range are executed) when the logical address range indicated by the deallocation command is read, the result obtained may all be 0; and (3) after the deallocation command is executed (before other write operations for the logical address range are executed) when the logical address range indicated by the deallocation command is read, the result obtained may be any value. The execution result of the deallocation command can be set or selected in the deallocation command or other commands.

SUMMARY

By using a deallocation command, a host can notify a solid-state drive of which logical address spaces do not store valid data any longer, so that the solid-state drive does not need to move invalid data when reclaiming the storage space. However, in the prior art, as the storage capacity of the solid-state storage device increases, the size of an FTL table increases, resulting in the need for a large number of memory access operations in the process of executing the deallocation command; this severely prolongs the time of processing the deallocation command, affects the performance of the solid-state drive, and further affects the execution of concurrent TO commands.

The delay in processing the deallocation command needs to be reduced. Furthermore, the delay in processing the IO command caused by processing the deallocation command needs to be reduced. The impact of processing the deallocation command on an IO command processing bandwidth also needs to be reduced.

According to the first aspect of the present application, a method executed by a first storage device according to the first aspect of the present application is provided, including: receiving a read command; if no entry in a deallocation table is marked with "deallocated", querying an FTL table to obtain a physical address corresponding to a logical address accessed by the read command; and obtaining data from the physical address as a response to the read command.

In the method executed by a first storage device according to the first aspect of the present application, a method executed by a second storage device according to the first aspect of the present application is provided, further including: if at least one entry in the deallocation table is marked with "deallocated", querying the deallocation table to determine whether the logical address accessed by the read command is deallocated; and if the logical address accessed by the read command is marked with "deallocated" in the deallocation table, taking a designated value as a response to the read command.

In the method executed by a second storage device according to the first aspect of the present application, a method executed by a third storage device according to the first aspect of the present application is provided, further including: if the logical address accessed by the read command is not marked with "deallocated" in the deallocation table, obtaining, according to the physical address obtained by querying the FTL table, data as a response to the read command.

In one of the methods executed by first to third storage devices according to the first aspect of the present application, a method executed by a fourth storage device according to the first aspect of the present application is provided, wherein the state of the deallocation table indicates whether any entry in the deallocation table is marked with "deallocated".

In one of the methods executed by first to fourth storage devices according to the first aspect of the present application, a method executed by a fifth storage device according to the first aspect of the present application is provided, further including: in response to receiving the deallocation command, setting the state of the deallocation table to indicate that at least one entry in the deallocation table is marked with "deallocated".

In one of the methods executed by first to fifth storage devices according to the first aspect of the present application, a method executed by a sixth storage device according to the first aspect of the present application is provided, further including: scanning the deallocation table, and updating, according to a logical address corresponding to the entry marked with "deallocated" in the deallocation table, an entry corresponding to the logical address in the FTL table as indicating "deallocated".

In the method executed by a sixth storage device according to the first aspect of the present application, a method executed by a seventh storage device according to the first aspect of the present application is provided, further including: in response to the completion of scanning the deallocation table, setting the state of the deallocation table to indicate that no entry in the deallocation table is marked with "deallocated".

In one of the methods executed by first to seventh storage devices according to the first aspect of the present application, a method executed by an eighth storage device according to the first aspect of the present application is provided, further including: in response to receiving a write command, allocating a physical address for the write command; if no entry in the deallocation table is marked with "deallocated", updating the FTL table by using a logical address of the write command and the allocated physical address; and writing data according to the physical address.

In the method executed by an eighth storage device according to the first aspect of the present application, a method executed by a ninth storage device according to the first aspect of the present application is provided, further including: if at least one entry in the deallocation table is marked with "deallocated", clearing the "deallocated" mark of an entry corresponding to the logical address of the write command in the deallocation table.

In the method executed by an eighth or ninth storage device according to the first aspect of the present application, a method executed by a tenth storage device according to the first aspect of the present application is provided, further including: before writing data according to the physical address, indicating to a sender of the write command that the write command has been completed.

In the method executed by an eighth storage device according to the first aspect of the present application, a method executed by an eleventh storage device according to the first aspect of the present application is provided, wherein in response to knowing that no entry in the deallocation table is marked with "deallocated", indicating to a sender of the write command that the write command has been completed.

In the method executed by an eighth or ninth storage device according to the first aspect of the present application, a method executed by a twelfth storage device according to the first aspect of the present application is provided, wherein in response to knowing that at least one entry in the deallocation table is marked with "deallocated", after clearing the "deallocated" mark of the entry corresponding to the logical address of the write command in the deallocation table, indicating to a sender of the write command that the write command has been processed.

In one of the methods executed by first to twelfth storage devices according to the first aspect of the present application, a method executed by a thirteenth storage device according to the first aspect of the present application is provided, wherein the deallocation table includes a first deallocation table and a second deallocation table, which respectively correspond to a first FTL table and a second FTL table; a state of the first deallocation table indicates whether any entry in the deallocation table including the first deallocation table and the second deallocation table is marked with "deallocated"; and a state of the second deallocation table indicates whether any entry in the deallocation table including the first deallocation table and the second deallocation table is marked with "deallocated".

In the method executed by a thirteenth storage device according to the first aspect of the present application, a method executed by a fourteenth storage device according to the first aspect of the present application is provided, further including: in response to receiving the deallocation command, setting the state of the first deallocation table and the state of the second deallocation table as that at least one entry in the deallocation table is marked with "deallocated".

In the method executed by a fourteenth storage device according to the first aspect of the present application, a method executed by a fifteenth storage device according to the first aspect of the present application is provided, further including: in response to the completion of scanning the first deallocation table, setting the state of the first deallocation table as "scanned"; and in response to the completion of scanning the second deallocation table, setting the state of the second deallocation table as "scanned".

In the method executed by a fifteenth storage device according to the first aspect of the present application, a method executed by a sixteenth storage device according to the first aspect of the present application is provided, further including: in response to setting the state of the first deallocation table as "scanned", if the state of the second deallocation table is "scanned" or "no record", setting the state of the first deallocation table as "no record", wherein the "no record" state indicates that no entry in the deallocation table including the first deallocation table and the second deallocation table is marked with "deallocated".

In the method executed by a fifteenth or sixteenth storage device according to the first aspect of the present application, a method executed by a seventeenth storage device according to the first aspect of the present application is provided, further including: in response to setting the state of the second deallocation table as "scanned", if the state of the first deallocation table is "scanned" or "no record", setting the state of the second deallocation table as "no record", wherein the "no record" state indicates that no entry in the deallocation table including the first deallocation table and the second deallocation table is marked with "deallocated".

In one of the methods executed by thirteenth to seventeenth storage devices according to the first aspect of the present application, a method executed by an eighteenth storage device according to the first aspect of the present application is provided, wherein a first CPU processes the deallocation command of accessing the first deallocation table; and a second CPU processes the deallocation command of accessing the second deallocation table.

In the method executed by an eighteenth storage device according to the first aspect of the present application, a method executed by a nineteenth storage device according to the first aspect of the present application is provided, further including: in response to that the state of the first deallocation table is updated, notifying, by the first CPU, the second CPU that the state of the first deallocation table is updated.

In the method executed by an eighteenth or nineteenth storage device according to the first aspect of the present application, a method executed by a twentieth storage device according to the first aspect of the present application is provided, further including: in response to that the state of the second deallocation table is updated, notifying, by the second CPU, the first CPU that the state of the second deallocation table is updated.

In one of the methods executed by first to twentieth storage devices according to the first aspect of the present application, a method executed by a twenty-first storage device according to the first aspect of the present application is provided, further including: obtaining an update log of the deallocation table; and if the update log of the deallocation table is compressible, caching the obtained update log of the deallocation table.

In the method executed by a twenty-first storage device according to the first aspect of the present application, a method executed by a twenty-second storage device according to the first aspect of the present application is provided, further including: if the update log of the deallocation table is not compressible, writing the update log of the deallocation table into an NVM chip.

In the method executed by a twenty-first or twenty-second storage device according to the first aspect of the present application, a method executed by a twenty-third storage device according to the first aspect of the present application is provided, further including: according to whether the obtained update log of the deallocation table and a buffered update log of the deallocation table are consecutive, determining whether the update log of the deallocation table is compressible.

In one of the methods executed by twenty-first to twenty-third storage devices according to the first aspect of the present application, a method executed by a twenty-fourth storage device according to the first aspect of the present application is provided, further including, according to whether the obtained update log of the deallocation table and the buffered update log of the deallocation table are consecutive and whether the obtained update log of the deallocation table and the buffered update log of the deallocation table come from the same source, determining whether the update log of the deallocation table is compressible.

According to the second aspect of the present application, a first storage device according to the second aspect of the present application is provided, including a control component, a memory, and an NVM chip, wherein the memory stores a deallocation table and an FTL table, and the control component executes one of the methods executed by first to twenty-fourth storage devices according to the first aspect of the present application.

According to the third aspect of the present application, a first storage device according to the third aspect of the present application is provided, including a control component, a memory, and an NVM chip, wherein the memory stores a deallocation table and an FTL table, and the control component includes a first CPU and a second CPU; and the first CPU and the second CPU respectively execute one of the methods executed by first to twenty-fourth storage devices according to the first aspect of the present application.

In the first storage device according to the third aspect of the present application, a second storage device according to the third aspect of the present application is provided, wherein the memory stores a first deallocation table, a second deallocation table, a first FTL table, and a second FTL table, the first deallocation table is used for the first FTL table, and the second deallocation table is used for the second FTL table; and the first CPU maintains the state of the first deallocation table, and the second CPU maintains the state of the second deallocation table.

In the first or second storage device according to the third aspect of the present application, a third storage device according to the third aspect of the present application is provided, further including an allocator, configured to allocate a received command to the first CPU or the second CPU.

In the third storage device according to the third aspect of the present application, a fourth storage device according to the third aspect of the present application is provided, wherein the allocator allocates, according to a logical address accessed by a deallocation command, the deallocation command to the first or second CPU corresponding to the logical address.

In the third or fourth storage device according to the third aspect of the present application, a fifth storage device according to the third aspect of the present application is provided, wherein the allocator allocates a read command or a write command to the first CPU or the second CPU, randomly or in turn.

According to the fourth aspect of the present application, a first method for processing a deallocation command according to the fourth aspect of the present application is provided, including: in response to receiving a deallocation command, obtaining an address range indicated by the deallocation command; and updating table items of the deallocation table according to the address range indicated by the deallocation command.

In the first method for processing a deallocation command according to the fourth aspect of the present application, a second method for processing a deallocation command according to the fourth aspect of the present application is provided, further including: updating table items of an FTL table according to the address range indicated by the deallocation command, wherein the FTL table records a physical address corresponding to a logical address.

In the first or second method for processing a deallocation command according to the fourth aspect of the present application, a third method for processing a deallocation command according to the fourth aspect of the present application is provided, wherein FTL table items indicated by a logical address range described by the deallocation command in the FTL table are provided with a special mark.

In one of the first to third methods for processing a deallocation command according to the fourth aspect of the present application, a fourth method for processing a deallocation command according to the fourth aspect of the present application is provided, wherein information corresponding to whether each address is deallocated is stored in the deallocation table.

In one of the first to fourth methods for processing a deallocation command according to the fourth aspect of the present application, a fifth method for processing a deallocation command according to the fourth aspect of the present application is provided, wherein in response to an address is deallocated, the address is marked with "allocated" in the deallocation table.

In one of the first to fifth methods for processing a deallocation command according to the fourth aspect of the present application, a sixth method for processing a deallocation command according to the fourth aspect of the present application is provided, wherein when an address is not allocated or the deallocation command has been applied thereto, the address is marked with "deallocated" in the deallocation table.

In one of the first to sixth methods for processing a deallocation command according to the fourth aspect of the present application, a seventh method for processing a deallocation command according to the fourth aspect of the present application is provided, according to the method for processing a deallocation command according to the first aspect of the present application, wherein after the deallocation table is updated, indicating to a host that the deallocation command has been executed.

In one of the first to seventh methods for processing a deallocation command according to the fourth aspect of the present application, an eighth method for processing a deallocation command according to the fourth aspect of the present application is provided, wherein updating the FTL table includes setting the FTL table items corresponding to one or more logical addresses indicated by the deallocation command to a designated value.

In one of the first to eighth methods for processing a deallocation command according to the fourth aspect of the present application, a ninth method for processing a deallocation command according to the fourth aspect of the present application is provided, wherein before updating the FTL table, the table items of the FTL table to be updated corresponding to one or more addresses is locked.

In one of the first to ninth methods for processing a deallocation command according to the fourth aspect of the present application, a tenth method for processing a deallocation command according to the fourth aspect of the present application is provided, wherein after updating the FTL table, the table items of the FTL table updated corresponding to one or more addresses is unlocked.

According to the fifth aspect of the present application, a first storage device according to the fifth aspect of the present application is provided, including: a control component configured to execute one of the methods for processing a deallocation command according to the fourth aspect of the present application; and an external memory and an NVM connected to the control component, wherein a deallocation table is stored in an internal memory of a control component of a solid-state storage device or stored in the external memory.

In the first storage device according to the fifth aspect of the present application, a second storage device according to the fifth aspect of the present application is provided, wherein when the solid-state storage device is powered off, the deallocation table is written into the NVM.

According to the sixth aspect of the present application, a first system for processing a deallocation command according to the sixth aspect of the present application is provided, including: a control component and an external memory, wherein the control component includes an allocator and multiple CPUs, wherein the allocator is configured to receive an IO command and allocate the IO command to each of the multiple CPUs, and the multiple CPUs are configured to process the received IO command in parallel; and the external memory is configured to store a deallocation table.

In the first system for processing a deallocation command according to the sixth aspect of the present application, a second system for processing a deallocation command according to the sixth aspect of the present application is provided, wherein the memory further stores an FTL table, and the FTL table records a physical address corresponding to a logical address.

In the first system for processing a deallocation command according to the sixth aspect of the present application, a third system for processing a deallocation command according to the sixth aspect of the present application is provided, wherein the deallocation table is divided into multiple parts, and each part is maintained by one of the multiple CPUs.

In one of the first to third systems for processing a deallocation command according to the sixth aspect of the present application, a fourth system for processing a deallocation command according to the sixth aspect of the present application is provided, wherein the allocator provides a deallocation command to one or more of the multiple CPUs at the same time, and a CPU processes a part in the deallocation command related to the deallocation table maintained by the CPU.

In one of the first to fourth systems for processing a deallocation command according to the sixth aspect of the present application, a fifth system for processing a deallocation command according to the sixth aspect of the present application is provided, wherein the IO command is allocated to the CPU according to an address accessed by the IO command.

In one of the first to fifth systems for processing a deallocation command according to the sixth aspect of the present application, a sixth system for processing a deallocation command according to the sixth aspect of the present application is provided, wherein the allocator allocates the IO command to the multiple CPUs according to logical address accessed by the IO command.

In one of the first to sixth systems for processing a deallocation command according to the sixth aspect of the present application, a seventh system for processing a deallocation command according to the sixth aspect of the present application is provided, wherein the deallocation table records that an address is in a "deallocated" state.

In one of the first to seventh systems for processing a deallocation command according to the sixth aspect of the present application, an eighth system for processing a deallocation command according to the sixth aspect of the present application is provided, wherein a corresponding table item of the FTL table is updated according to a table item of the deallocation table marked with the "deallocated" state, and the "deallocated" state is recorded in the FTL table item.

In one of the first to eighth systems for processing a deallocation command according to the sixth aspect of the present application, a ninth system for processing a deallocation command according to the sixth aspect of the present application is provided, wherein the deallocation table is updated in response to processing the deallocation command, and one or more CPUs check the deallocation tables maintained by the CPUs periodically or when the CPUs are idle.

In one of the first to ninth systems for processing a deallocation command according to the sixth aspect of the present application, a tenth system for processing a deallocation command according to the sixth aspect of the present application is provided, wherein the one or more CPUs each store a check mark.

In the tenth system for processing a deallocation command according to the sixth aspect of the present application, an eleventh system for processing a deallocation command according to the sixth aspect of the present application is provided, wherein the check mark at least indicates that there is at least one entry marked with "deallocated" in the deallocation table maintained by the CPU.

In the eleventh system for processing a deallocation command according to the sixth aspect of the present application, a twelfth system for processing a deallocation command according to the sixth aspect of the present application is provided, wherein the check mark further indicates a progress of check of the deallocation table.

In one of the first to twelfth systems for processing a deallocation command according to the sixth aspect of the present application, a thirteenth system for processing a deallocation command according to the sixth aspect of the present application is provided, wherein a CPU only can update the deallocation table maintained thereby, but can read all deallocation tables.

In one of the first to thirteenth systems for processing a deallocation command according to the sixth aspect of the present application, a fourteenth system for processing a deallocation command according to the sixth aspect of the present application is provided, wherein an address space accessed by the IO command is divided into multiple areas, and each area is mapped to one of multiple deallocation tables.

In the fourteenth system for processing a deallocation command according to the sixth aspect of the present application, a fifteenth system for processing a deallocation command according to the sixth aspect of the present application is provided, wherein an address space accessed by the deallocation command from a host is mapped to each allocation table as uniform as possible so as to map a logical address space to the deallocation table.

In the fifteenth system for processing a deallocation command according to the sixth aspect of the present application, a sixteenth system for processing a deallocation command according to the sixth aspect of the present application is provided, wherein the size of an address area indicated by each table item of the deallocation table is configurable.

According to the seventh aspect of the present application, a first method for processing a deallocation command according to the seventh aspect of the present application is provided, including: sending a received deallocation command to multiple CPUs at the same time; and obtaining, by the CPU which receives the deallocation command, according to an address range indicated by the deallocation command, one or more addresses belonging to a deallocation table maintained by the CPU in the address range indicated by the deallocation command, and updating, according to the obtained one or more addresses, the deallocation table maintained by the CPU, so that the one or more addresses are recorded as deallocated in the deallocation table.

In the first method for processing a deallocation command according to the seventh aspect of the present application, a second method for processing a deallocation command according to the seventh aspect of the present application is provided, further including: updating an FTL table according to the address range indicated by the deallocation command.

In the first or second method for processing a deallocation command according to the seventh aspect of the present application, a third method for processing a deallocation command according to the seventh aspect of the present application is provided, including checking the deallocation table regularly or periodically to find a first table item marked with "deallocated", recording, in the FTL table, according to the first table item, that a corresponding logical address is deallocated, and clearing the "deallocated" mark of the first table item in the deallocation table.

In one of the first to third methods for processing a deallocation command according to the seventh aspect of the present application, a fourth method for processing a deallocation command according to the seventh aspect of the present application is provided, further including updating, according to the address range indicated by the deallocation command, a valid data amount recorded in a chunk descriptor.

In the fourth method for processing a deallocation command according to the seventh aspect of the present application, a fifth method for processing a deallocation command according to the seventh aspect of the present application is provided, including, when there is no table item marked with "deallocated" in the deallocation table, clearing or resetting a check mark corresponding to the deallocation table, wherein the check mark indicates whether at least one entry in the deallocation table is marked with "deallocated".

In the fifth method for processing a deallocation command according to the seventh aspect of the present application, a sixth method for processing a deallocation command according to the seventh aspect of the present application is provided, wherein if the check mark is cleared, there is no need to access the deallocation table when processing a read command or a write command.

In the fifth method for processing a deallocation command according to the seventh aspect of the present application, a seventh method for processing a deallocation command according to the seventh aspect of the present application is provided, wherein if the check mark is set, the deallocation table needs to be accessed when processing a read command or a write command.

According to the eighth aspect of the present application, a method for garbage collection by a first storage device according to the eighth aspect of the present application is provided, including the following steps: selecting, according to a chunk descriptor table, a chunk to be collected; obtaining, according to the chunk to be collected, an address of data to be collected; and if a deallocation table needs to be checked, accessing the deallocation table according to the address of the data to be collected, and if a corresponding table item of the deallocation table is marked with "deallocated", obtaining, from the chunk to be collected, the next data to be collected.

In the method for garbage collection by a first storage device according to the eighth aspect of the present application, a method for garbage collection by a second storage device according to the eighth aspect of the present application is provided, including, if a corresponding table item of the deallocation table is not marked with "deallocated", querying an FTL table according to the address of the data to be collected so as to identify whether the data to be collected is valid; and if the data to be collected is valid, writing the data to be collected into a new chunk, and updating the FTL table.

In the method for garbage collection by a first or second storage device according to the eighth aspect of the present application, a method for garbage collection by a third storage device according to the eighth aspect of the present application is provided, including identifying, according to a check mark, whether the deallocation table needs to be checked, wherein the check mark indicates whether at least one entry in the deallocation table is marked with "deallocated".

In one of the methods for garbage collection by first to third storage devices according to the eighth aspect of the present application, a method for garbage collection by a fourth storage device according to the eighth aspect of the present application is provided, including if there is no need to check the deallocation table, querying the FTL table according to the address to obtain a recorded physical address, and identifying, according to whether the recorded physical address is consistent with the physical address of the data to be collected, whether the data to be collected is valid.

In the method for garbage collection by a fourth storage device according to the eighth aspect of the present application, a method for garbage collection by a fifth storage device according to the eighth aspect of the present application is provided, including for valid data to be collected, writing the valid data to be collected into the new chunk, and further updating the FTL table by using a physical address of the new chunk so as to record, in the FTL table, a new storage position of the valid data to be collected.

According to the ninth aspect of the present application, a first method for processing a deallocation command according to the ninth aspect of the present application is provided, including the following steps: sending a received deallocation command to multiple CPUs; and obtaining, by each CPU, from an address range indicated by the deallocation command, one or more addresses belonging to a deallocation table maintained by the CPU, and updating, according to the one or more addresses, the deallocation table maintained by the CPU, so that the one or more addresses are recorded as deallocated in the deallocation table.

In the first method for processing a deallocation command according to the ninth aspect of the present application, a second method for processing a deallocation command according to the ninth aspect of the present application is provided, including updating, by a CPU, according to the received deallocation command, a check mark maintained by the CPU, wherein the check mark indicates whether at least one entry in the deallocation table is marked with "deallocated".

In the first or second method for processing a deallocation command according to the ninth aspect of the present application, a third method for processing a deallocation command according to the ninth aspect of the present application is provided, including updating, by the CPU, according to the address range indicated by the deallocation command, table items of an FTL table, wherein the FTL table records a physical address corresponding to a logical address.

In the first method for processing a deallocation command according to the ninth aspect of the present application, a fourth method for processing a deallocation command according to the ninth aspect of the present application and the method for processing a deallocation command according to the sixth aspect of the present application are provided, wherein updating table items of an FTL table according to the address range indicated by the deallocation command includes: determining, by the CPU, whether at least one entry in the deallocation table is marked with "deallocated", and marking, with "deallocated", an address recorded by a second table item of the FTL table corresponding to an obtained first table item marked with "deallocated".

In the third or fourth method for processing a deallocation command according to the ninth aspect of the present application, a fifth method for processing a deallocation command according to the ninth aspect of the present application is provided, including after the address recorded by the marked table item in the FTL table is deallocated, clearing the "deallocated" mark of the table item of the deallocation table.

In one of the third to fifth methods for processing a deallocation command according to the ninth aspect of the present application, a sixth method for processing a deallocation command according to the ninth aspect of the present application is provided, wherein before updating the FTL table, the table items of the FTL table to be updated corresponding to one or more addresses is locked.

In one of the third to fifth methods for processing a deallocation command according to the ninth aspect of the present application, a seventh method for processing a deallocation command according to the ninth aspect of the present application is provided, wherein the deallocation command is provided to each or more of the multiple CPUs at the same time, and the multiple CPUs process the deallocation command in parallel.

In the third method for processing a deallocation command according to the ninth aspect of the present application, an eighth method for processing a deallocation command according to the ninth aspect of the present application is provided, wherein a CPU processes a part in the deallocation command related to the deallocation table maintained by the CPU.

In one of the third to seventh methods for processing a deallocation command according to the ninth aspect of the present application, a ninth method for processing a deallocation command according to the ninth aspect of the present application is provided, wherein IO commands associated with different parts of the FTL table are allocated, according to addresses accessed by the IO commands, to different CPUs for processing.

In one of the third to seventh methods for processing a deallocation command according to the ninth aspect of the present application, a tenth method for processing a deallocation command according to the ninth aspect of the present application is provided, wherein the IO command is randomly allocated to different CPUs for processing.

In the ninth or tenth method for processing a deallocation command according to the ninth aspect of the present application, an eleventh method for processing a deallocation command according to the ninth aspect of the present application is provided, wherein in response to receiving a read command, if the check mark of the deallocation table is set, the CPU accesses the deallocation table to check whether an address accessed by the read command is deallocated.

In one of the ninth to eleventh methods for processing a deallocation command according to the ninth aspect of the present application, a twelfth method for processing a deallocation command according to the ninth aspect of the present application is provided, wherein in response to receiving the read command, if the check mark of the deallocation table is not set, the CPU queries the FTL table to obtain an address, and reads data from the address as a response to the read command.

In one of the first to twelfth methods for processing a deallocation command according to the ninth aspect of the present application, a thirteenth method for processing a deallocation command according to the ninth aspect of the present application is provided, further including: in response to garbage collection to be performed, selecting a chunk to be collected; obtaining, according to the chunk to be collected, an address of data to be collected; and if the deallocation table needs to be checked, accessing the deallocation table according to the address of the data to be collected, and if a corresponding table item of the deallocation table is marked with "deallocated", obtaining next data to be collected from the chunk to be collected.

In the thirteenth method for processing a deallocation command according to the ninth aspect of the present application, a fourteenth method for processing a deallocation command according to the ninth aspect of the present application is provided, including if the corresponding table item of the deallocation table is not marked with "deallocated", querying the FTL table according to the address of the data to be collected so as to identify whether the data to be collected is valid; and if the data to be collected is valid, writing the data to be collected into a new chunk, and updating the FTL table.

In the thirteenth or fourteenth method for processing a deallocation command according to the ninth aspect of the present application, a fifteenth method for processing a deallocation command according to the ninth aspect of the present application is provided, including identifying, according to the check mark, whether the deallocation table is to be checked, wherein the check mark indicates whether at least one entry in the deallocation table is marked with "deallocated".

In the fifteenth method for processing a deallocation command according to the ninth aspect of the present application, a sixteenth method for processing a deallocation command according to the ninth aspect of the present application is provided, including if there is no need to check the deallocation table, querying the FTL table according to the address to obtain a recorded physical address, and identifying, according to whether the recorded physical address is consistent with the physical address of the data to be collected, whether the data to be collected is valid.

In the fifteenth or sixteenth method for processing a deallocation command according to the ninth aspect of the present application, a seventeenth method for processing a deallocation command according to the ninth aspect of the present application is provided, including for valid data to be collected, writing the valid data to be collected into the new chunk, and further updating the FTL table by using a physical address of the new chunk so as to record, in the FTL table, a new storage position of the valid data to be collected.

In one of the first to seventeenth methods for processing a deallocation command according to the ninth aspect of the present application, an eighteenth method for processing a deallocation command according to the ninth aspect of the present application is provided, wherein the check mark records a start position, the current position, and an end position of check of the deallocation table.

In the eighteenth method for processing a deallocation command according to the ninth aspect of the present application, a nineteenth method for processing a deallocation command according to the ninth aspect of the present application is provided, wherein the check mark further records a start position and an end position of next check of the deallocation table.

In one of the first to nineteenth methods for processing a deallocation command according to the ninth aspect of the present application, a twentieth method for processing a deallocation command according to the ninth aspect of the present application is provided, further including: clearing the deallocation table according to the check mark.

In the twentieth method for processing a deallocation command according to the ninth aspect of the present application, a twenty-first method for processing a deallocation command according to the ninth aspect of the present application is provided, wherein clearing the deallocation table includes: checking table items of the deallocation table one by one from the start position of the deallocation table to the end position of the deallocation table recorded in the check mark, if a table item is marked with "deallocated", updating a corresponding table item of the FTL table on this basis, recording a "deallocated" state in the table item of the FTL table, and clearing the "deallocated" state of the table item in the deallocation table.

In the twentieth or twenty-first method for processing a deallocation command according to the ninth aspect of the present application, a twenty-second method for processing a deallocation command according to the ninth aspect of the present application is provided, including during clearing the deallocation table, if a new deallocation command is received, updating the start position, the current position, and the end position of the deallocation table in the check mark according to the new deallocation command.

In the twenty-second method for processing a deallocation command according to the ninth aspect of the present application, a twenty-third method for processing a deallocation command according to the ninth aspect of the present application is provided, wherein updating the check mark includes: if the start position and the end position of the new deallocation command are both after the end position recorded in the check mark, updating the end position in the check mark as the end position of the new deallocation command.

In the twenty-third method for processing a deallocation command according to the ninth aspect of the present application, a twenty-fourth method for processing a deallocation command according to the ninth aspect of the present application is provided, wherein updating the check mark includes: if the start position of the new deallocation command is after the start position recorded in the check mark, the end position is before the end position recorded in the check mark, and the current position is before the start position of the new deallocation command, there is no need to update the check mark.

In the twenty-third method for processing a deallocation command according to the ninth aspect of the present application, a twenty-fifth method for processing a deallocation command according to the ninth aspect of the present application is provided, wherein updating the check mark includes: if the start position of the new deallocation command is after the start position recorded in the check mark, the end position is before the end position recorded in the check mark, and the current position is after the start position of the new deallocation command, recording, in the check mark, a start position of next scanning as the start position of the new deallocation command and an end position of the next scanning as the current position.

In the twenty-third method for processing a deallocation command according to the ninth aspect of the present application, a twenty-sixth method for processing a deallocation command according to the ninth aspect of the present application is provided, wherein updating the check mark includes: if the start position and the end position of the new deallocation command are both before the start position recorded in the check mark, and the current position is after the end position of the new deallocation command, recording, in the check mark, a start position of next scanning as the start position of the new deallocation command and an end position of the next scanning as the end position of the new deallocation command.

In the twenty-third method for processing a deallocation command according to the ninth aspect of the present application, a twenty-seventh method for processing a deallocation command according to the ninth aspect of the present application is provided, wherein updating the check mark includes: if the start position of the new deallocation command is before the start position recorded in the check mark, the end position is after the end position recorded in the check mark, and the current position is after the end position of the new deallocation command, recording, in the check mark, a start position of next scanning as the start position of the new deallocation command and an end position of the next scanning as the end position of the new deallocation command.

In the fifteenth method for processing a deallocation command according to the ninth aspect of the present application, a twenty-eighth method for processing a deallocation command according to the ninth aspect of the present application is provided, including during checking or clearing the deallocation table, if one or more new deallocation commands are received, updating the start position and the end position of next check of the deallocation table in the check mark according to the new deallocation commands.

In the twenty-eighth method for processing a deallocation command according to the ninth aspect of the present application, a twenty-ninth method for processing a deallocation command according to the ninth aspect of the present application is provided, including determining, by comparing the end position recorded in the check mark with the current position of clearing the deallocation table, whether clearing of the deallocation table is completed.

In the twenty-eighth or twenty-ninth method for processing a deallocation command according to the ninth aspect of the present application, a thirtieth method for processing a deallocation command according to the ninth aspect of the present application is provided, wherein if the current position of clearing the deallocation table does not reach the end position in the check mark, the clearing of the deallocation table is not completed.

In one of the twenty-eighth to thirtieth methods for processing a deallocation command according to the ninth aspect of the present application, a thirty-first method for processing a deallocation command according to the ninth aspect of the present application is provided, including if the current position of clearing the deallocation table reaches the end position, further checking whether the deallocation table needs to be cleared again.

According to the tenth aspect of the present application, a computer program is provided, wherein when the computer program is loaded in a storage device and executed on a control component of the storage device, computer program codes included in the computer program enable the control component to execute one of the methods according to the first to ninth aspects of the present application.

BRIEF DESCRIPTION OF THE DRAWINGS

To describe the technical solutions in embodiments of the present application or in the prior more clearly, the accompanying drawings required for describing the embodiments are briefly introduced below. Apparently, the accompanying drawings in the following description show merely some embodiments of the present application, and a person of ordinary skill in the art can still derive other accompanying drawings from these accompanying drawings without an inventive effort.

FIG. 3A is a schematic diagram of part of an FTL table before processing a deallocation command according to embodiments of the present application;

FIG. 3B is a schematic diagram of part of an FTL table after processing a deallocation command according to embodiments of the present application;

FIG. 4A is a schematic diagram of a deallocation table before processing a deallocation command in embodiments of the present application;

DETAILED DESCRIPTION

The technical solutions in embodiments of the present application are clearly and fully described below with reference to the accompanying drawings in the embodiments of the present application. Apparently, the described embodiments are merely some of the embodiments of the present application, but not all the embodiments. Based on the embodiments of the present application, all other embodiments obtained by a person of ordinary skill in the art without involving an inventive effort shall fall within the scope of protection of the present application.

FIG. 3A is a schematic diagram of part of an FTL table before processing a deallocation command according to embodiments of the present application. FIG. 3B is a schematic diagram of part of an FTL table after processing a deallocation command according to embodiments of the present application.

Referring to FIG. 3A, an FTL table records physical addresses (denoted as PPA a-b) corresponding to logical address ranges 0-7 (respectively denoted as LBA 0 to LBA 7), wherein "PPA" indicates a physical address, "a" indicates a physical block, and "b" indicates a physical page. Taking physical block 1 as an example, the physical page having the physical address of "PPA 1-4" stores data having a logical address of "LBA 0", and the physical page having the physical address of "PPA 1-10" stores data having the logical address of "LBA 3".

According to embodiments of the present application, in order to execute a deallocation operation, in an FTL table, FTL table items indicated by a logical address range described by a deallocation command are provided with a special mark (such as 0 or other values). For example, the logical address range indicated by a deallocation command includes 0-7 and 100-103. In order to execute the deallocation command, the contents of entries in which logical addresses 0-7 and 100-103 are recorded in the FTL table are set to be 0. Referring to FIG. 3B, the physical addresses corresponding to the logical address range 0-3 (respectively denoted as LBA 0 to LBA 3) in the FTL table are changed as 0, and the physical addresses corresponding to the logical address range 4-7 (respectively denoted as LBA 4 to LBA 7) are not changed with respect to FIG. 3A.

Therefore, when one or more of logical addresses LBA 0-7 or LBA 100-103 are to be read next, the physical addresses corresponding to these logical addresses are found from the FTL table to be 0 (meaning the special mark), and then a result meeting a designated effect of the deallocation command (such as all 0s) is taken as a response to a read command. It can be understood that the logical address range indicated by the deallocation command and table items of the FTL table can have different unit sizes. For example, in the deallocation command, one logical address corresponds to a 512-byte storage space, and in the FTL table, one table item corresponds to a 4 KB storage space.

Figures 4B, 5A:
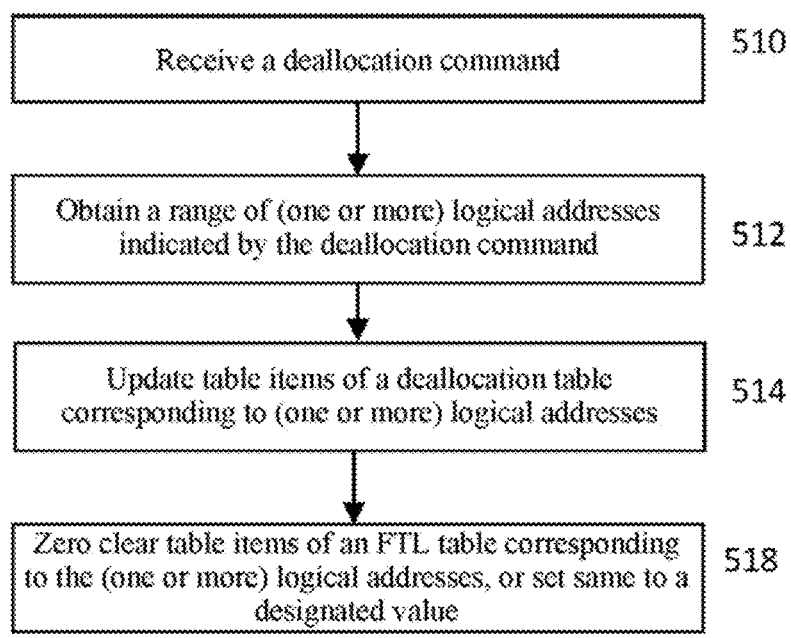
FIG. 4B is a schematic diagram of a deallocation table after processing a deallocation command in embodiments of the present application.
FIG. 5A is a flowchart of a method for processing a deallocation command in embodiments of the present application.

According to embodiments of the present application, in order to process a deallocation command efficiently, a deallocation table needs to be maintained. FIG. 4A is a schematic diagram of a deallocation table before processing a deallocation command in embodiments of the present application. FIG. 4B is a schematic diagram of a deallocation table after processing a deallocation command in embodiments of the present application. The deallocation table stores information corresponding to whether each logical address in an FTL table is deallocated. As an example, each logical address in the FTL table is provided with a 1-byte storage space in the deallocation table.

As shown in FIG. 4A, when a logical address is allocated (i. e., in the FTL table, the logical address has a valid physical address) (also referring to FIG. 3A), in the deallocation table, the logical address is marked with "allocated" (for example, the corresponding 1-byte storage space is set to be 0); and when a logical address is not allocated or the deallocation command has been applied thereto (also referring to FIG. 3B), the logical address is marked with "deallocated" in the deallocation table (for example, the corresponding 1-byte storage space is set to be 1).

Exemplarily, regarding the deallocation table shown by FIG. 4A corresponding to the FTL table before processing the deallocation command shown by FIG. 3A, the logical addresses LBA 0-LBA 7 in the FTL table are all allocated with valid physical addresses. Therefore, in the deallocation table shown by FIG. 4A, LBA 0-LBA 7 are all marked with "allocated" (the corresponding 1-byte storage spaces are all set to be 0). In response to receiving the deallocation command, the deallocation command is executed for the logical address range of LBA 0-LBA 3. Part of the FTL table is shown by FIG. 3B, and part of the deallocation table is shown by FIG. 4B. LBA 0-LBA 3 in the deallocation table are all marked with "deallocated" (the corresponding 1-byte storage spaces are all set to be 1), and LBA 4-LBA 7 in the deallocation table are still marked with "allocated" (the corresponding 1-byte storage spaces are all set to be 0).

Figure 1:
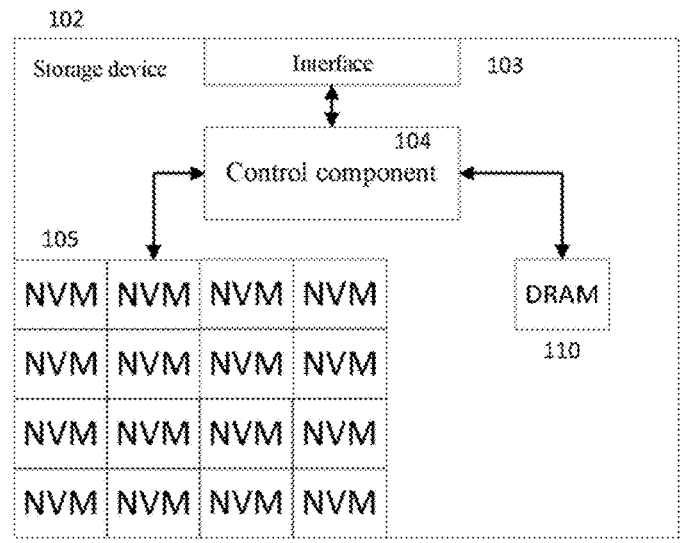
FIG. 1 is a block diagram of a solid-state storage device in the prior art.
Figure 2:
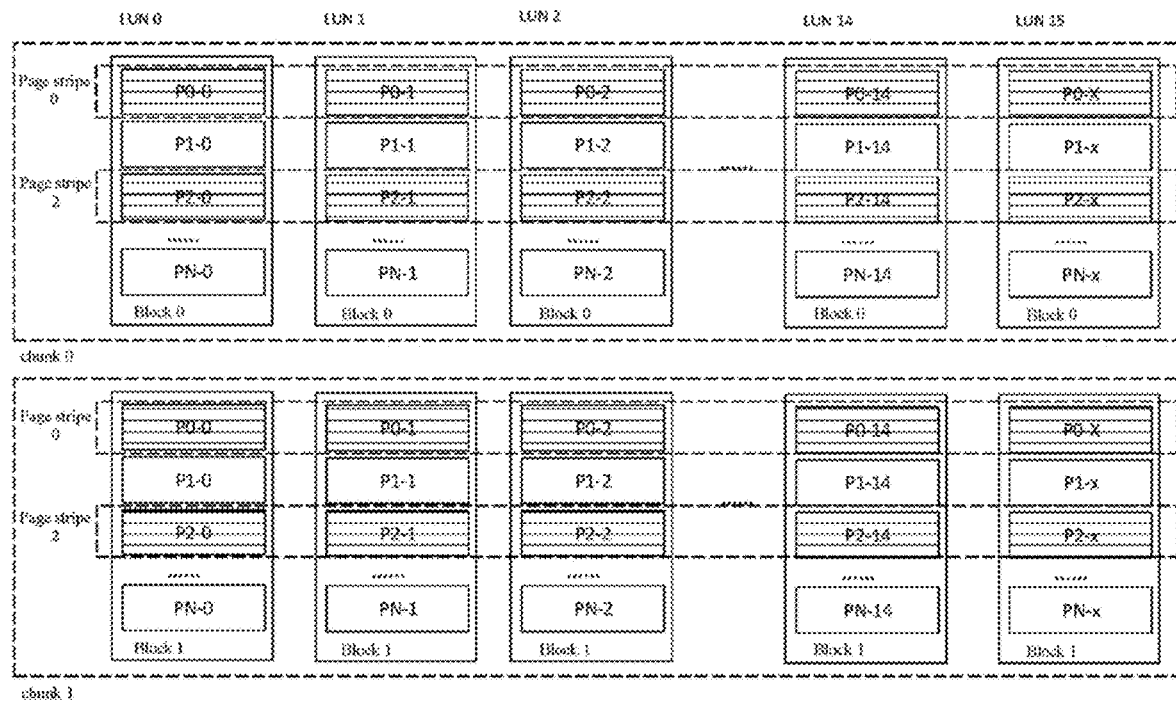
FIG. 2 is a schematic diagram of a chunk.

Exemplarily, according to the embodiments of the present application, the deallocation table is stored in the internal memory of the control component 104 (referring to FIG. 1) or DRAM 110. Optionally, the deallocation table is updated through a DMA operation.

Furthermore, when a solid-state storage is powered off, the FTL table and the deallocation table are further written into an NVM, so that when restart is enabled after abnormal power off, the FTL table and the deallocation table in the case of power off can be restored from the NVM.

FIG. 5A is a flowchart of a method for processing a deallocation command in embodiments of the present application. In response to receiving a deallocation command (510), a logical address range indicated by the deallocation command is obtained (S512). For example, the deallocation command indicates to deallocate the logical address range of LBA 0-LBA 3. Table items of a deallocation table (referring to FIGS. 4A and 4B) are updated according to the logical address range indicated by the deallocation command (514). For example, the table items corresponding to logical addresses LBA 0-LBA 3 in the deallocation table shown by FIG. 4A are marked with "deallocated" (having value 1) (as shown in FIG. 4B). After the deallocation table is updated, the completion of execution of the deallocation command can be indicated to a host. Therefore, the execution speed of the deallocation command is greatly increased. Table items of an FTL table are further updated according to the logical address range indicated by the deallocation command (518). For example, the FTL table items corresponding to one or more logical addresses indicated by the deallocation command are subjected to zero clearing or provided with a designated value (referring to FIG. 3B). Optionally, before updating the FTL table, the table items of the FTL table to be updated corresponding to the one or more logical addresses are further locked, so as to avoid that when the FTL table items are updated, other tasks read these FTL table items; and after updating the FTL table, the table items of the FTL table updated corresponding to the one or more logical addresses are further unlocked.

Figure 5B:
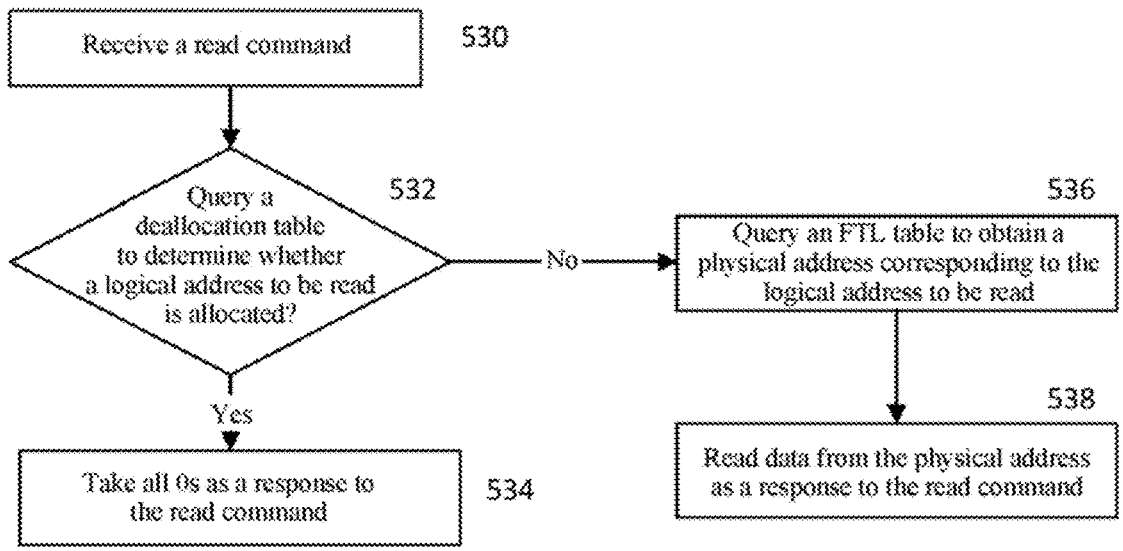
FIG. 5B is a flowchart of a method for responding to a read command in embodiments of the present application.

FIG. 5B is a flowchart of a method for responding to a read command in embodiments of the present application. When reading a deallocated logical address, a host should receive a designated indication such as all 0s.

Referring to FIG. 5B, in response to receiving a read command (530), a deallocation table (also referring to FIG.

4B) is queried to determine whether a logical address read by the read command is deallocated (532). If the deallocation table indicates that the read logical address is in a "deallocated" state, all 0s or another designated result is taken as a response to the read command (534). At step 532, if the deallocation table indicates that the read logical address is allocated, an FTL table is queried to obtain a physical address corresponding to a logical address to be read (536), and data is read from the obtained physical address as a response to the read command (538).

Optionally, querying the deallocation table increases the delay of a read operation, and for the read command of accessing the allocated logical address, querying the deallocation table is not positive. As a result, the state that a solid-state storage device is executing a deallocation command is further recorded. In response to receiving the deallocation command (510), it is marked that the storage device is executing the deallocation command. In this case, if the read command is received, the deallocation table is first queried (referring to 532 in FIG. 5B). After the deallocation command is executed, for example, after step 518 shown in FIG. 5A is executed, it is marked that the storage device has executed the deallocation command. In this case, if the read command is received, it is not necessary to execute step 532 in FIG. 5B, and step 536 in FIG. 5B is directly executed.

Figure 5C:
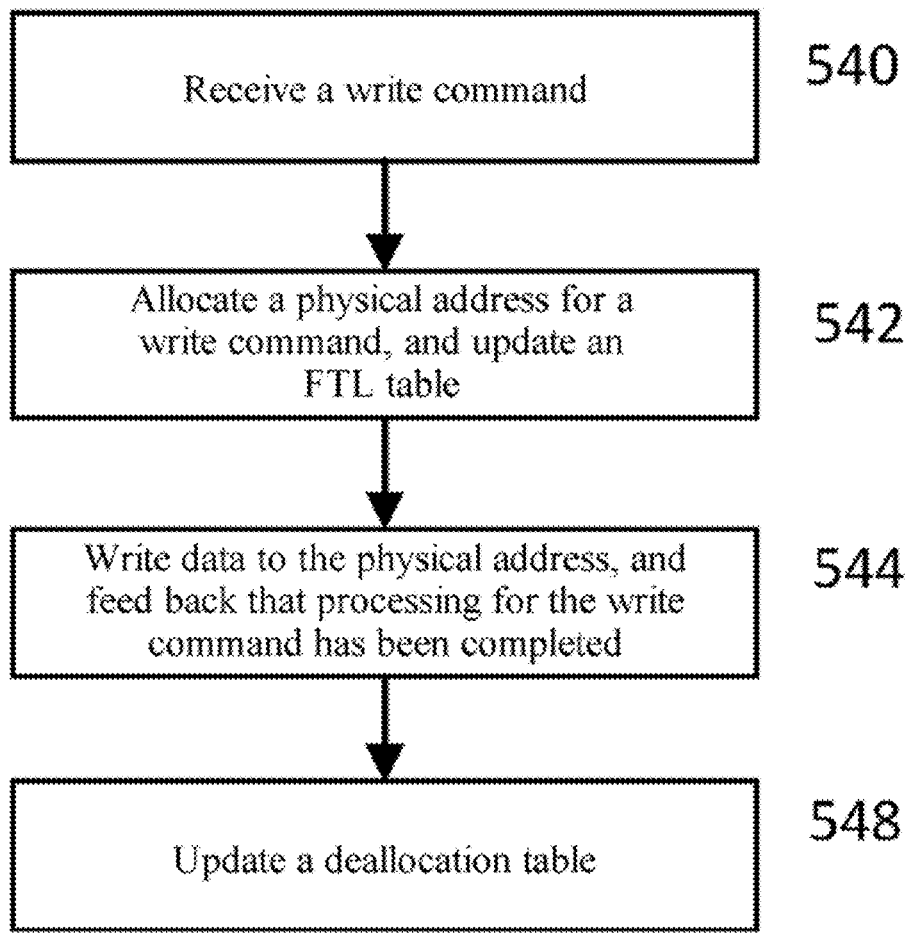
FIG. 5C is a flowchart of a method for responding to a write command in embodiments of the present application.

FIG. 5C is a flowchart of a method for responding to a write command in embodiments of the present application.

For a solid-state storage device in which no data has been written, a deallocation table thereof indicates that all logical addresses are in a "deallocated" state. In response to that data is written into a logical address, a table item corresponding to the logical address into which data is written in the deallocation table is modified to be in an "allocated" state. Moreover, in response to executing a deallocation command, the table item corresponding to the deallocated address in the deallocation table is modified to be in the "deallocated" state again.

Referring to FIG. 5C, when a write command is received (540), a physical address is allocated to the write command, and an FTL table is updated by using a logical address indicated by the write command and the allocated physical address (542). Data is written into the allocated physical address, and the completion of processing the write command is fed back to a host (544). Optionally, in order to reduce the delay in processing the write command, after step 542, the completion of processing the write command is fed back to the host before the data is written into the physical address. The deallocation table is then updated, i. e., a table item corresponding to the logical address into which data is written in the deallocation table is set to be "allocated" (548). In FIG. 5C, the order of step 542, step 544, and step 548 can be adjusted, or step 542, step 544, and step 548 can be executed concurrently or simultaneously. Preferably, step 544 and step 548 are executed after step 542.

Figure 6A:
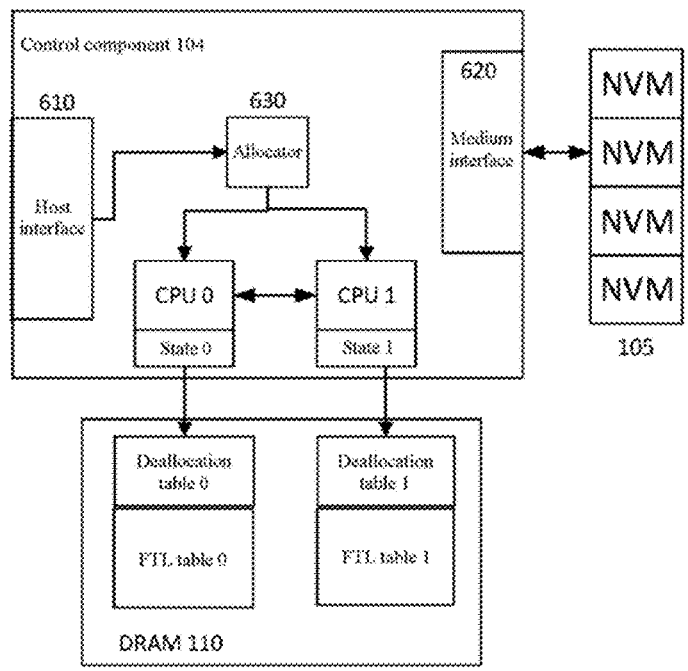
FIG. 6A is a block diagram of a control component according to another embodiment of the present application.

FIG. 6A is a block diagram of a control component according to another embodiment of the present application. A control component 104 illustrated in FIG. 6A includes a host interface 610, an allocator 630, multiple CPUs (CPU 0 and CPU 1) for an FTL task, and a medium interface 620 for accessing an NVM chip 105.

The host interface 610 is configured to exchange commands and data with a host. In one example, the host communicates with a storage device through an NVMe/PCIe protocol. The host interface 610 processes a PCIe protocol data packet, extracts an NVMe protocol command, and returns a processing result of the NVMe protocol command to the host.

The allocator 630 is coupled to the host interface 610, and is configured to receive an IO command sent by the host to the storage device and allocate the IO command to one of the multiple CPUs for processing the FTL task. The allocator 630 can be implemented by the CPUs or special-purpose hardware.

The control component 104 is further coupled to an external memory (such as DRAM) 110. Referring to FIG. 6A, the external memory 110 stores FTL table 0, FTL table 1, deallocation table 0, and deallocation table 1. The multiple CPUs for processing the FTL task process the FTL task by using the FTL tables and the deallocation tables.

For a write command, under the instruction of the CPUs, a new physical address is allocated to a logical address into which data is to be written, the FTL table records a mapping relation between the logical address and the physical address, and the deallocation table is then updated. For a read command, the CPU accesses the FTL table and/or the deallocation table to obtain a physical address corresponding to a logical address of the read command, and data is read from the physical address.

According to the embodiment of FIG. 6A, an FTL table is divided into two parts (FTL table 1 and FTL table 2). CPU 0 corresponds to FTL table 0, and CPU 1 corresponds to FTL table 1. For example, depending on whether a logical address is odd or even, whether the logical address is in FTL table 0 or FTL table 1 is determined. For another example, the first half logical addresses of a logical address space are located in FTL table 0, and the second half addresses are located in FTL table 1. There are also many other ways of dividing the FTL table into FTL table 0 and FTL table 1. Deallocation table 0 corresponds to FTL table 0, and records whether the logical addresses in FTL table 0 are deallocated. Deallocation table 1 corresponds to FTL table 1, and records whether the logical addresses in FTL table 1 are deallocated. CPU 0 corresponds to deallocation table 0, and CPU 1 corresponds to deallocation table 1. Therefore, IO commands associated with different parts of the FTL table can be processed by different CPUs. The allocator 630 allocates the IO command to CPU 0 or CPU 1 according to the logical address accessed by the OI command. CPU 0 and CPU 1 process the IO commands in parallel.

Optionally, each of CPU 0 and CPU 1 can access all the FTL tables and/or the deallocation tables. Therefore, the allocator can allocate any OI command to any CPU for processing.

According to the embodiment of FIG. 6A, the CPU further maintains the state of the deallocation table corresponding thereto. CPU 0 maintains state 0, and CPU 1 maintains state 1. State 0 indicates the state of deallocation table 0, and state 1 indicates the state of deallocation table 1. The state of the deallocation tables at least indicate whether at least one entry in the deallocation tables is marked with "deallocated". Therefore, as an example, for deallocation table 0, state 0 only uses one-byte information to indicate whether at least one entry in the deallocation table is marked with "deallocated"; and for deallocation table 1, state 1 only uses one-byte information to indicate whether at least one entry in the deallocation table is marked with "deallocated". Therefore, state 0 and state 1 require extremely small storage spaces, and can be stored in internal registers or memories of the CPUs.

Figure 6B:
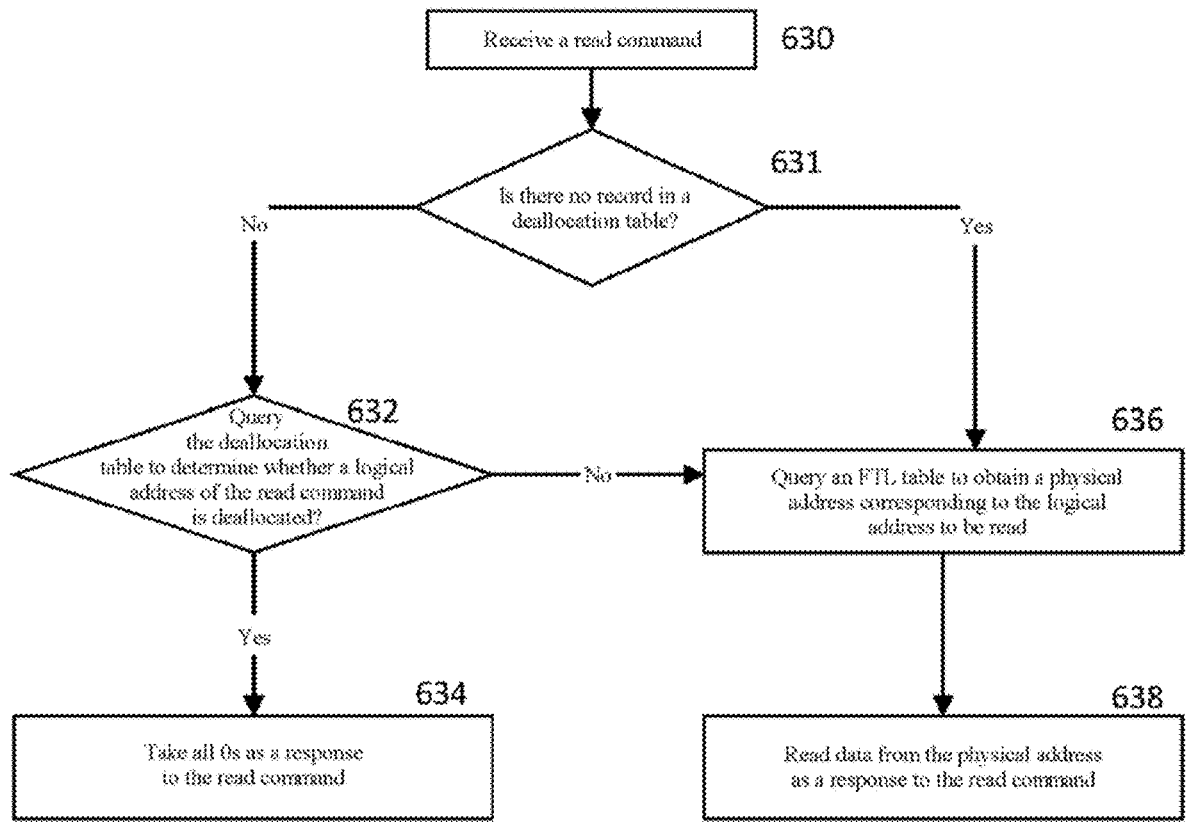
FIG. 6B is a flowchart of a method for responding to a read command according to the embodiment of FIG. 6A.

FIG. 6B is a flowchart of a method for responding to a read command according to the embodiment of FIG. 6A.

Referring to FIG. 6B, in response to receiving a read command (630), as an example, an allocator allocates the read command to CPU 0 (also referring to FIG. 6A) for processing. CPU 0 first queries state 0 to determine whether at least one record in deallocation table 0 is marked with "deallocated" (631). If state 0 indicates that no record in deallocation table 0 is marked with "deallocated", CPU 0 queries FTL table 0 to obtain a physical address corresponding to a logical address to be read (636), and data is read from the obtained physical address as a response to the read command (638), when there is no need to access deallocation table 0. If state 0 indicates that at least one record in deallocation table 0 is marked with "deallocated" (631), CPU 0 queries deallocation table 0 (also referring to FIG. 4B) to determine whether a logical address read by the read command is deallocated (632). If deallocation table 0 indicates that the read logical address is in a "deallocated" state, all 0s or another designated result is taken as a response to the read command (634). At step 632, when the deallocation table indicates that the read logical address is allocated, FTL table 0 is queried to obtain the physical address corresponding to the logical address to be read (636), and data is read from the obtained physical address as the response to the read command (638).

CPU 0 further maintains state 0. CPU 0 scans deallocation table 0, and if it is found that no record in deallocation table 0 is marked with "deallocated", state 0 is set, correspondingly; and deallocation table 0 is updated in response to execution of a deallocation command, and state 0 is set to indicate that at least one record in deallocation table 0 is marked with "deallocated". Similarly, CPU 1 maintains state 1.

Figure 6C:
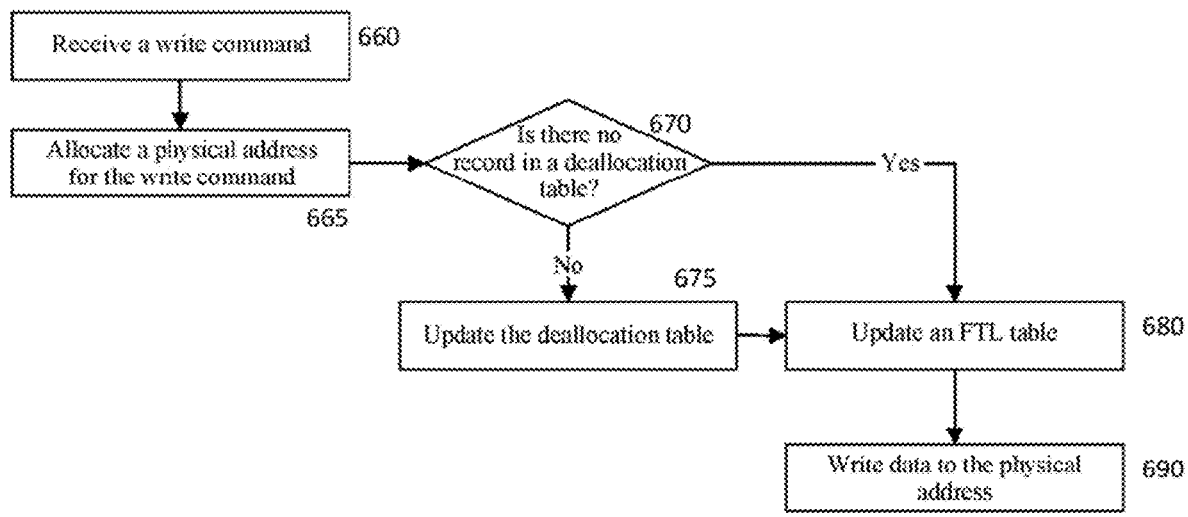
FIG. 6C is a flowchart of a method for responding to a write command according to the embodiment of FIG. 6A.

FIG. 6C is a flowchart of a method for responding to a write command according to the embodiment of FIG. 6A.

Referring to FIG. 6C, in response to receiving a write command (660), as an example, an allocator allocates the write command to CPU 0 (also referring to FIG. 6A) for processing. CPU 0 allocates a physical address for the write command (665), so as to carry data to be written by the write command. CPU 0 queries state 0 to determine whether at least one record in deallocation table 0 is marked with "deallocated" (670). If state 0 indicates that no record in deallocation table 0 is marked with "deallocated", CPU 0 updates an FTL table (such as FTL table 0) according to a logical address of the write command and the physical address allocated for the write command at step 665 (680), wherein the FTL table records a correspondence between the logical address of the write command and the physical address allocated therefor; and state 0 further indicates that an NVM chip writes data of the write command to the allocated physical address (690). Optionally, before step 690, an indication for the completion of processing the write command is generated, and sent to a sender of the write command.

At step 670, if state 0 indicates that deallocation table 0 has an entry marked with "deallocated", the entry of deallocation table 0 is further updated according to a logical address of the write command (675), so that the entry corresponding to the logical address of the write command in the deallocation table is set to be "allocated" or the "deallocated" identifier of the entry is cleared. Optionally, if step 670 needs to be executed, the execution order of step 670 and step 675 is not defined.

Figure 7A:
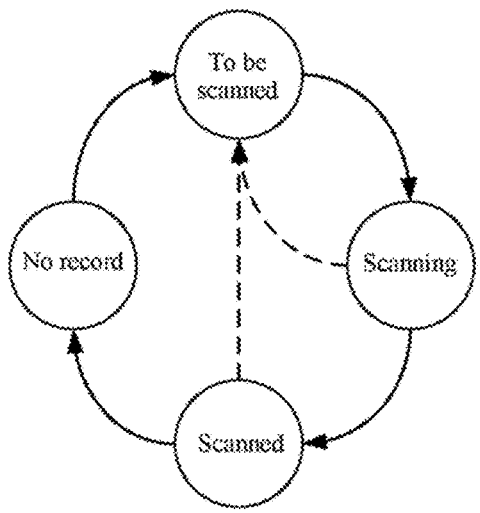
FIG. 7A is a state transition diagram for the state of a deallocation table according to another embodiment of the present application.

FIG. 7A is a state transition diagram for the state of a deallocation table according to another embodiment of the present application.

The state of a deallocation table includes a "to be scanned" state, a "scanning" state, a "scanned" state, and a "no record" state. Therefore, state 0 and/or state 1 includes at least two bytes to indicate the four states of the deallocation table.

An allocator (referring to FIG. 6A) allocates a deallocation command of accessing a logical address space corresponding to FTL 0 to CPU 0 for processing, and allocates a deallocation command of accessing a logical address space corresponding to FTL 1 to CPU 1 for processing.

Taking CPU 0 as an example, in response to processing a deallocation command for deallocation table 0, CPU 0 sets state 0 (also referring to FIG. 6A) as "to be scanned", regardless of the previous state of state 0. Since the deallocation command is executed, some entries in deallocation table 0 are set as "deallocated". State 0 is set as the "to be scanned" state, and also indicates that at least one record in the deallocation table is marked with "deallocated" (also referring to step 631 in FIG. 6). Optionally, when state 0 is "to be scanned", "scanning", or "scanned", state 0 indicates that at least one record in deallocation table 0 is marked with "deallocated" (also referring to step 631 in FIG. 6); and when state 0 is "no record", state 0 indicates that no record in deallocation table 0 is marked with "deallocated" (also referring to step 631 in FIG. 6).

Optionally or further, in response to processing a deallocation command for deallocation table 0, CPU 0 further sets state 1 (also referring to FIG. 6A) as "to be scanned", or requests CPU 1 to set state 1 (also referring to FIG. 6A) as "to be scanned"; and similarly, in response to processing a deallocation command for deallocation table 1 or setting state 1 as "to be scanned", state 0 is set as "to be scanned".

In some conditions, CPU 0 starts clearing deallocation table 0, and sets, according to an entry set as "deallocated" in deallocation table 0, a physical address of a corresponding entry in FTL table 0 as a designated value (such as 0). For example, CPU 0 clears deallocation table 0 in an idle period during which no IO command is to be processed. Or, in response to an indication of a host, CPU 0 starts clearing deallocation table 0. In response to starting clearing deallocation table 0, CPU 0 further sets state 0 of "to be scanned" as "scanning".

In response to that CPU 0 completes clearing of deallocation table 0, CPU 0 sets state 0 of "scanning" as "scanned". In order to complete clearing of the deallocation table, CPU 0 sets the physical address of the entry of FTL table 0 corresponding to the entry marked with "deallocated" in deallocation table 0 as the designated value, and correspondingly, the entry set as "deallocated" in deallocation table 0 is modified by clearing the "deallocated" mark, so as to indicate that the corresponding entry of FTL table 0 records a real mapping relation between the logical address and the physical address which correspond to each other.

If state 0 is "scanned", CPU 0 further obtains the state indicated by state 1. If state 1 is "scanned" or "no record", CPU 0 sets state 0 as "no record".

In one implementation, if state 0 is "scanned", CPU 0 accesses or requests CPU 1 for the value of state 1. In another implementation, if state 0 enters "scanned", CPU 0 notifies CPU 1 of a state change result of the state. In still another implementation, when state change happens to state 0, CPU 0 notifies CPU 1 of a state change result of the state.

Further, in response to changing state 0 as "no record", if state 1 is "scanned", state 1 is further set as "no record".

According to embodiments of the present application, CPU 1 maintains state 1 in the similar mode to CPU 0. FIG.

7B is a flowchart of processing a deallocation command according to the embodiment shown in FIG. 6A of the present application. In response to receiving a deallocation command (710), an allocator 630 allocates the deallocation command to one of CPUs (such as CPU 0). The allocator 630 selects, according to a logical address range indicated by the deallocation command, a CPU responsible for the corresponding logical address range so as to process the deallocation command (720), i. e., sending the deallocation command to the selected CPU (such as CPU 0). The selected CPU (CPU 0) sets, according to the logical address range indicated by the deallocation command, one or more corresponding entries of a deallocation table as "deallocated" (730). At this point, a host indicates that processing of the deallocation command has been completed; and state 0 is set as "to be scanned".

Figure 7B:
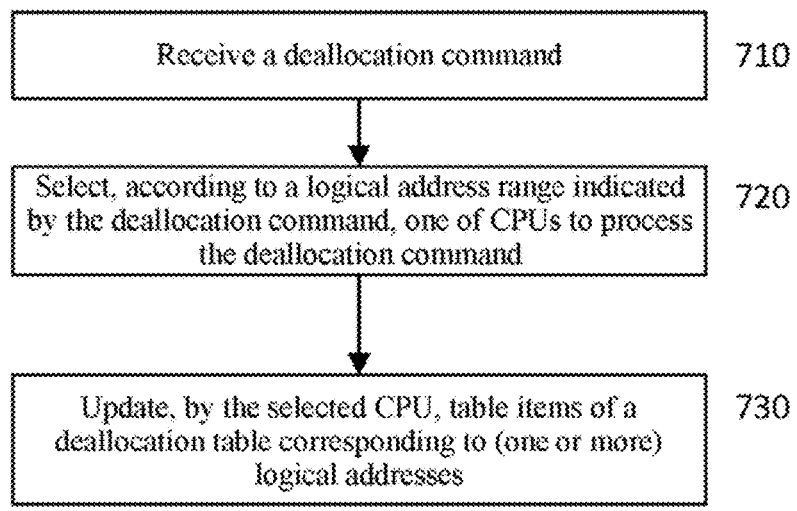
FIG. 7B is a flowchart of processing a deallocation command according to the embodiment shown in FIG. 6A of the present application.
Figure 7C:
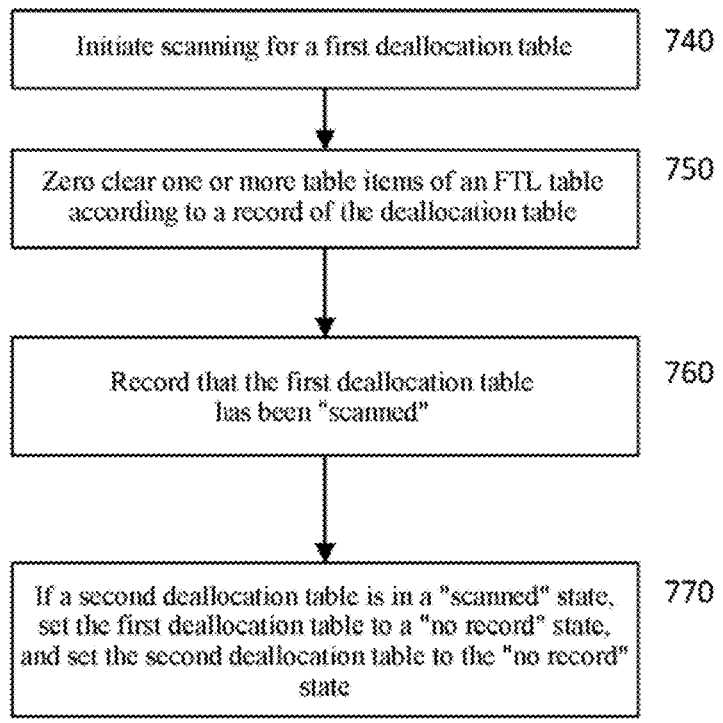
FIG. 7C is a flowchart of scanning a deallocation table according to the embodiment shown in FIG. 6A of the present application.

FIG. 7C is a flowchart of scanning a deallocation table according to the embodiment shown in FIG. 6A of the present application.

In the case that state 0 is "to be scanned", when there is no IO command to be processed or in response to an indication of a host, a CPU (taking CPU 0 as an example) initiates a scan for deallocation table 0 for which CPU 0 is responsible (740). CPU 0 traverses deallocation table 0, obtains a logical address of each entry indicated as "deallocated" in the deallocation table, and modifies a physical address of an entry corresponding to the logical address in a corresponding FTL table (FTL 0) as a designated value indicating that the logical address is "deallocated" (750). CPU 0 further updates the entry indicated as "deallocated" in deallocation table 0 by clearing the "deallocated" mark. Optionally, in response to starting scanning deallocation table 0, CPU 0 further sets state 0 as "scanning".

When CPU 0 clears all the "deallocated" marks in deallocation table 0, it means that the scanning for deallocation table 0 has been completed. In response to that the scanning for deallocation table 0 has been completed, CPU 0 sets state 0 as "scanned" (760). When receiving a deallocation command during scanning deallocation table 0, CPU 0 stops the scanning and updates state 0 as "to be scanned".

In response to that state 0 is set as "scanned", CPU 0 further obtains the state indicated by state 0. If state 1 is "scanned" or "no record" at this point, CPU 0 sets state 0 as "no record" (770); and if state 1 is "scanned", CPU 0 sets state 0 as "no record" and also enables the state to be set as "no record". The maintenance for state 1 is performed by, for example, CPU 1.

Figure 8:
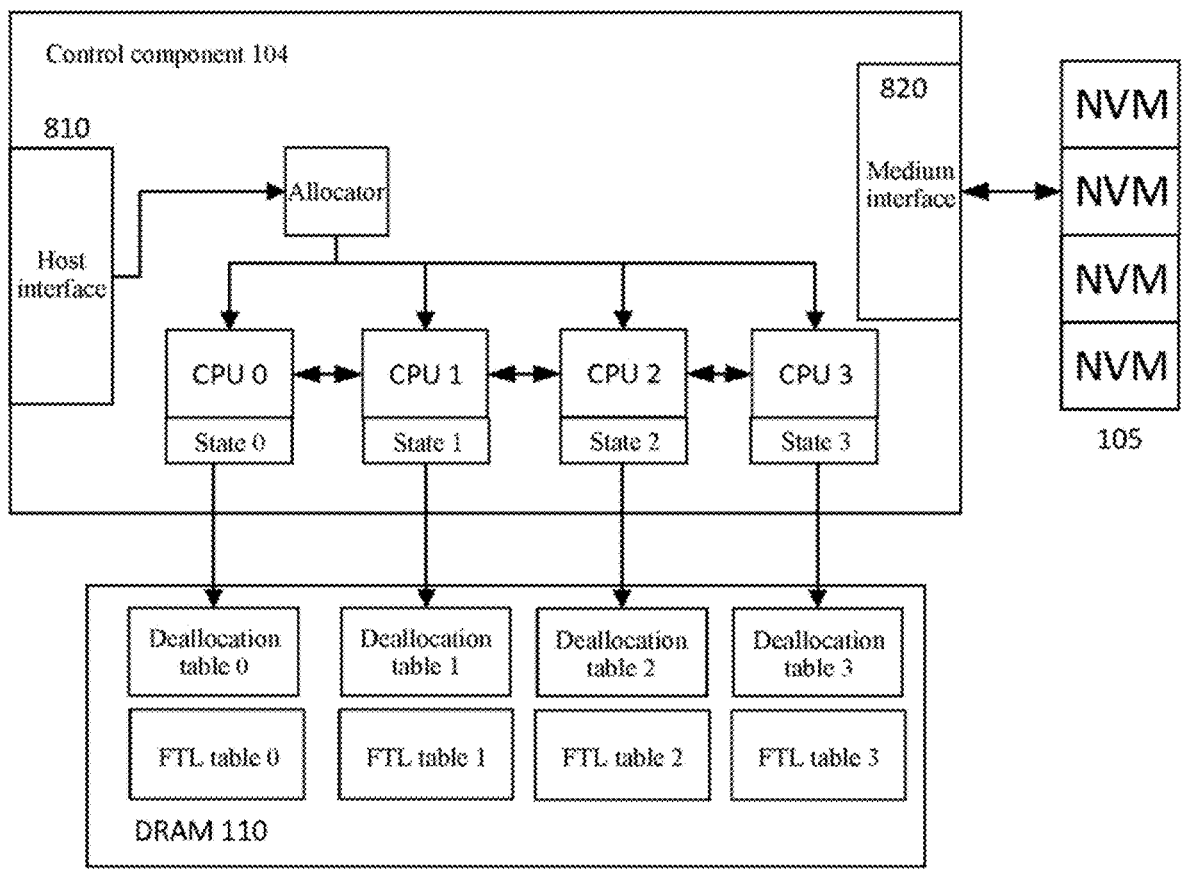
FIG. 8 is a block diagram of a control component according to another embodiment of the present application.

FIG. 8 is a block diagram of a control component according to another embodiment of the present application. A control component 104 illustrated in FIG. 8 includes a host interface 810, an allocator, multiple CPUs (CPU 0, CPU 1, CPU2, and CPU3) for an FTL task, and a medium interface 820 for accessing an NVM chip 105.

The allocator is configured to receive a command sent by a host to a storage device, and allocate the command to one of the multiple CPUs for processing the FTL task.

The control component 104 is further coupled to an external memory (such as DRAM) 110. Referring to FIG. 8, the external memory 110 stores FTL table 0, FTL table 1, FTL table 2, FTL table 3, deallocation table 0, deallocation table 1, deallocation table 2, and deallocation table 3. The multiple CPUs for processing the FTL task process the FTL task by using the FTL tables and the deallocation tables.

According to the embodiment of FIG. 8, an FTL table is divided into four parts (FTL table 1, FTL table 2, FTL table 3, and FTL table 4). CPU 0 corresponds to FTL table 0, CPU 1 corresponds to FTL table 1, CPU 2 corresponds to FTL table 2, and CPU 3 corresponds to FTL table 3. For example, which FTL table a logical address is located in is determined according to the remainder of dividing the logical address by 4. For another example, the first quarter logical addresses of a logical address space are located in FTL table 0, the next quarter logical address are located in FTL table 1, and so on. There are also many other ways of dividing the FTL table. Deallocation table 0 corresponds to FTL table 0, and records whether the logical addresses in FTL table 0 are deallocated. Deallocation table 1 corresponds to FTL table 1, and records whether the logical addresses in FTL table 1 are deallocated. Deallocation table 2 corresponds to FTL table 2, and records whether the logical addresses in FTL table 2 are deallocated. Deallocation table 3 corresponds to FTL table 3, and records whether the logical addresses in FTL table 3 are deallocated.

CPU 0 corresponds to deallocation table 0, CPU 1 corresponds to deallocation table 1, CPU 2 corresponds to deallocation table 2, and CPU 3 corresponds to deallocation table 3. Therefore, commands associated with different parts of the FTL table can be processed by different CPUs. The allocator allocates the command to one of CPU 0, CPU 1, CPU 2, and CPU 3 according to the logical address accessed by the command. The multiple CPUs process the commands in parallel.

Optionally, each CPU can access all the FTL tables and/or the deallocation tables. Therefore, the allocator can allocate any OI command to any CPU for processing.

According to the embodiment of FIG. 8, the CPU further maintains the state of the deallocation table corresponding thereto. CPU 0 maintains state 0, CPU 1 maintains state 1, CPU 2 maintains state 2, and CPU 3 maintains state 3. State 0 indicates the state of deallocation table 0, state 1 indicates the state of deallocation table 1, state 2 indicates the state of deallocation table 2, and state 3 indicates the state of deallocation table 3. The states of the deallocation tables at least indicate whether at least one entry in all the deallocation tables is marked with "deallocated".

According to the embodiment of FIG. 8, each CPU maintains and uses state 0, state 1, state 2, and state 3 according to the methods shown in FIGS. 6A, 7A, and 7B.

Further, every time a CPU updates the state maintained thereby, the update for the state is broadcast or notified to the other CPUs, so that any CPU can know the latest values of the states maintained by the other CPUs. The CPU also updates the state maintained thereby according to the received updates for the states maintained by the other CPUs. Moreover, in the case that state 0 is "scanned", only when CPU 0 identifies that the states maintained by all the other CPUs are all "scanned" or "no record", can state 0 maintained by CPU 0 be set as "no record"; and in the case that state 0 is "no record", when CPU 0 receives a deallocation command or identifies that the state maintained by any other CPU is "scanned" or "scanning", state 0 is set as "to be scanned".

Figures 9, 10A:
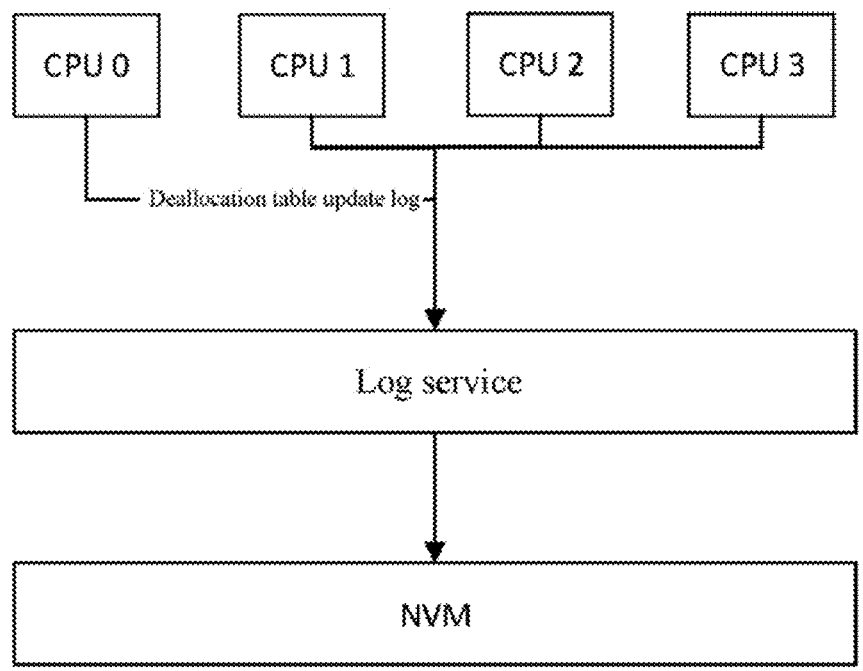
FIG. 9 is a schematic diagram of a system for processing a log according to embodiments of the present application.
FIG. 10A is a schematic diagram of a log entry buffer according to embodiments of the present application.

FIG. 9 is a schematic diagram of a system for processing a log according to embodiments of the present application.

In order to improve the reliability of a solid-state storage device, the solid-state storage device records logs of all updates for important metadata thereof (such as an FTL table and a deallocation table). Referring to FIG. 9, any of multiple CPUs generates a log (called an FTL table log or a deallocation table log) entry in response to any update of, for example, the FTL table and/or the deallocation table. Taking the deallocation table log as an example, the log entry records an index of an updated deallocation table entry, and an updated content of the deallocation table entry. Optionally, the log entry further records a generator or a source of the log (called a log identifier). The log identifier indicates, for example, CPU 0. CPU 0 sends the log entry to a log service of the solid-state storage device. The log service can be provided by one or more of multiple CPUs of a control component. The log service generates data blocks from multiple log entries and writes the data blocks to an NVM chip.

Generally, the deallocation command accesses a large logical address space, and results in the generation of a great number of logs, thereby affecting the performance of the solid-state storage device. According to embodiments of the present application, the deallocation table log is compressed to reduce the data amount of the log written to the NVM chip.

FIG. 10A is a schematic diagram of a log entry buffer according to embodiments of the present application.

A log service component maintains multiple log entry buffers. For example, the number of log entry buffers is consistent with the size of a set of values of log identifiers. FIG. 10A shows four log entry buffers, respectively corresponding to four CPUs of a control component which generate deallocation table logs. Each log entry buffer indicates a log identifier (for indicating a log source such as the CPU). The log entry buffer further records a deallocation table index and an optional count value. The deallocation table index indicates which entry of a deallocation table a log entry comes from, and also indicates a logical address corresponding to the deallocation table entry serving as the source of the log entry. The log service component compresses the deallocation table log according to the log entry buffer.

Figures 10B, 10C:
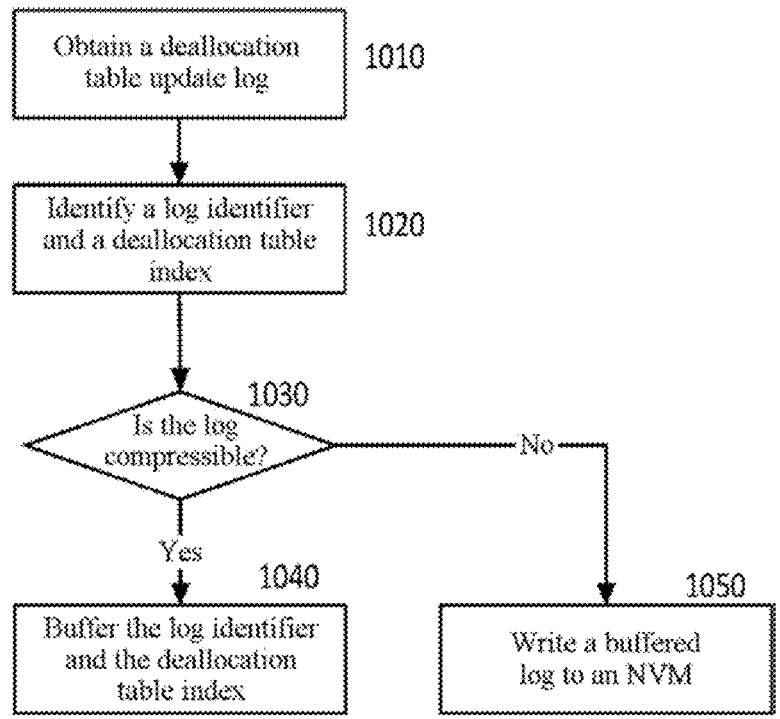
FIG. 10B is a flowchart of compressing a deallocation table log according to embodiments of the present application.
FIG. 10C is a schematic diagram of a log entry buffer according to another embodiment of the present application.

FIG. 10B is a flowchart of compressing a deallocation table log according to embodiments of the present application.

A log service component obtains a deallocation table log from a CPU (1010) as well as a source or a log identifier (such as CPU 0) of the obtained deallocation table log and a deallocation table index indicated according to the obtained deallocation table log (1020). Whether the deallocation table log is compressible is identified (1030). For example, a log entry buffer is accessed according to the log identifier, and comparison is performed to determine whether a deallocation table index recorded in the log entry buffer and the deallocation table index obtained from the received deallocation table log are consecutive. If the deallocation table index of the buffer and the received deallocation table index are consecutive, it is identified that the log is compressible, and the deallocation table index is updated as a newly received value in the accessed log entry buffer. Optionally, a count value of the log entry buffer is also progressively increased. Still optionally, if the count value is greater than a threshold, log data to be written to an NVM chip is generated according to the log entry buffer, so as to avoid excessive buffered logs. If the deallocation table index of the buffer and the received deallocation table index are not consecutive, it is identified that the log is not compressible, and then data to be written to an NVM chip is generated according to the log entry buffer and the log entry buffer is updated according to the received deallocation table log.

FIG. 10C is a schematic diagram of a log entry buffer according to another embodiment of the present application.

A log entry buffer has multiple entries, and each entry records a deallocation table index and a count value. A log service component identifies consecutive deallocation table logs by using the log entry buffer. In response to receiving a deallocation table log, the log service component identifies whether the received deallocation table log hits the log entry buffer. If the log entry buffer is hit, it means that a deallocation table index corresponding to the received deallocation table log and a deallocation table index recorded in a certain entry of the log entry buffer are consecutive or identical. In this case, the count value of the hit entry of the log entry buffer is updated. If the count value is greater than a threshold, log data to be written to an NVM chip is generated according to the log entry buffer, so as to avoid excessive buffered logs. If the received deallocation table log does not hit the log entry buffer and there is still an idle entry in the log entry buffer, the received deallocation table log is recorded in the idle entry, without writing data to the NVM chip. If the received deallocation table log does not hit the log entry buffer and there is no idle entry in the log entry buffer, log data to be written to the NVM chip is generated according to the log entry buffer and/or the received deallocation table entry. Optionally, the log entry buffer is updated according to the received deallocation table log.

Figure 11:
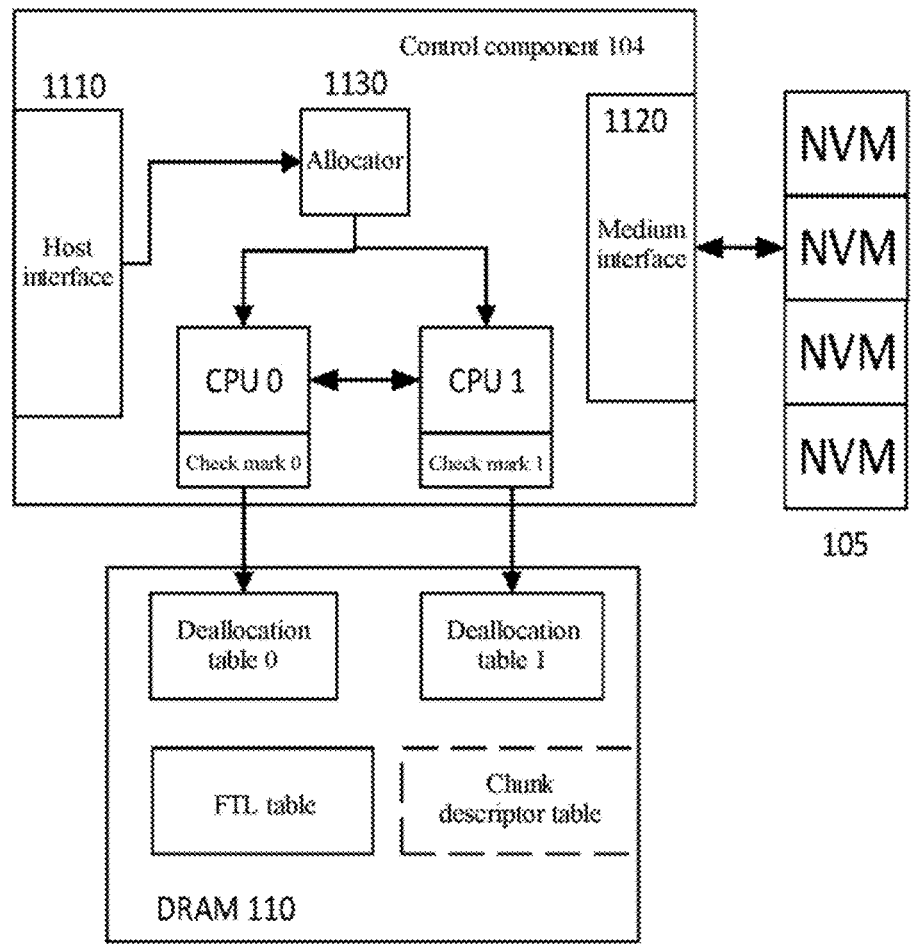
FIG. 11 is a block diagram of a control component according to yet another embodiment of the present application.

FIG. 11 is a block diagram of a control component according to yet another embodiment of the present application. A control component 104 illustrated in FIG. 11 includes a host interface 1110, an allocator 1130, multiple CPUs (CPU 0 and CPU 1), and a medium interface 1120 for accessing an NVM chip 105.

The host interface 1110 is configured to exchange commands and data with a host. The allocator 1130 is coupled to the host interface 1110, and is configured to receive an IO command sent by the host to a storage device and allocate the IO command to one of the multiple CPUs. For a deallocation command, the allocator 1130 sends the deallocation command to each of the multiple CPUs at the same time, so that the multiple CPUs cooperatively process the same deallocation command to further accelerate processing for the deallocation command.

The control component 104 is further coupled to an external memory (such as DRAM) 110. The external memory 110 stores an FTL table, deallocation table 0, and deallocation table 1. The multiple CPUs process an FTL task by using the FTL table and the deallocation tables.

According to the embodiment of FIG. 11, an IO command is allocated to each of the multiple CPUs, so that the multiple CPUs process multiple IO commands in parallel. For example, an IO command is allocated to CPU 0 or CPU 1 depending on whether a logical address accessed by the IO command is odd or even. For another example, the IO command accessing the first half logical address space is allocated to CPU 0, and the IO command accessing the second half logical address space is allocated to CPU 1. In another example, the IO command is allocated to CPU 0 or CPU 1, randomly or in turn, without considering the logical address accessed by the IO command.

The deallocation table is divided into two parts (deallocation table 0 and deallocation table 1). CPU 0 maintains deallocation table 0 and CPU 1 maintains deallocation table 1. For example, whether an entry corresponding to a logical address is located in deallocation table 0 or deallocation table 1 is determined depending on whether the logical address is odd or even. Optionally, the control component has a greater number of CPUs for processing the FTL task, and each CPU maintains its own deallocation table. For example, the logical addresses are sequentially allocated, according to the sizes, to the deallocation tables for maintenance. For example, n deallocation tables are provided (n is a positive integer), and the result of performing modulo operation on n by a logical address is taken as an index of maintaining the deallocation table of the logical address.

Referring back to FIG. 11, for the deallocation command, the allocator 1130 provides the deallocation command to CPU 0 and CPU 1 at the same time. CPU 0 processes the part in the deallocation command maintained by deallocation table 0, and CPU 1 processes the part in the deallocation command maintained by deallocation table 1. Therefore, CPU 0 and CPU 1 process the same deallocation command at the same time, thereby accelerating the processing process for the deallocation command. For example, deallocation table 0 maintains a deallocation table entry of a logical address having an even value, and deallocation table 1 maintains a deallocation table entry of a logical address having an odd value.

IO commands associated with different parts of the FTL table are processed by different CPUs. The allocator 1130 allocates the IO command to CPU 0 or CPU 1 according to the logical address accessed by the IO command. CPU 0 and CPU 1 process multiple IO commands in parallel.

For a write command, the allocator 1130 allocates the write command to CPU 0 or CPU 1 according to a logical address accessed by the write command. For example, deallocation table 0 corresponding to CPU 0 maintains a deallocation table entry of an even logical address, and then a read command or the write command accessing the even logical address is also allocated to CPU 0. For another example, the read command or the write command is randomly allocated to CPU 0 or CPU 1. For still another example, the read command or the write command is allocated to CPU 0 or CPU 1 in turn. For another example, the read command or the write command is allocated to CPU 0 or CPU 1 according to the load of CPU 0 or CPU 1.

Under the indication of, for example, CPU 0, a new physical address is allocated to a logical address to which data is to be written indicated by the write command, and a mapping relation between the logical address and the physical address is recorded in the FTL table.

For the read command, the allocator 1130 allocates the read command to CPU 0 or CPU 1. Under the indication of, for example, CPU 0, the FTL table is accessed, so as to obtain the physical address corresponding to the logical address of the read command and read data form the physical address.

The deallocation table temporarily records that the logical address is in a "deallocated" state. CPU 0 or CPU 1 further checks the deallocation table, updates a corresponding entry of the FTL table according to a deallocation table entry marked with the "deallocated" state, and records the "deallocated" state in the FTL entry. In response to processing the deallocation command and updating the deallocation table, CPU 0 or CPU 1 checks the deallocation table periodically or when CPU 0 or CPU 1 is idle. A check mark for indicating that the deallocation table is to be checked or check has not been completed is also recorded. Referring to FIG. 6, check mark 0 maintained by CPU 0 indicates whether deallocation table 0 needs to be checked or that check has not been completed, and check mark 1 maintained by CPU 1 indicates whether deallocation table 1 needs to be checked or that check has not been completed.

Check mark 0 and check mark 1 at least indicate whether at least one entry in respective deallocation tables is marked with "deallocated". Therefore, as an example, for deallocation table 0, check mark 0 only uses one-byte information to indicate whether at least one entry in deallocation table 0 is marked with "deallocated"; and for deallocation table 1, check mark 1 only uses one-byte information to indicate whether at least one entry in deallocation table 1 is marked with "deallocated". Therefore, check mark 0 and check mark 1 require extremely small storage spaces, and can be stored in internal registers or memories of the CPUs. Optionally, a descriptor of the deallocation table is also stored together with the check mark, so as to indicate the progress of check of the deallocation table. It will be introduced in detail later.

In still optional implementation, CPU 0 can update deallocation table 0 but cannot update deallocation table 1, and CPU 1 can update deallocation table 1 but cannot update deallocation table 0. CPU 0 and CPU 1 both can read deallocation table 0 and deallocation table 1.

In still optional implementation, a chunk descriptor is used for describing each chunk of a storage device. Each entry of a chunk descriptor table describes one of chunks, for example, recording the series number of the chunk, a physical address of a physical block constituting the chunk, a valid data amount of the chunk, and the number of times the chunk is erased. The chunk descriptor table is stored in DRAM 110.

Figure 12:
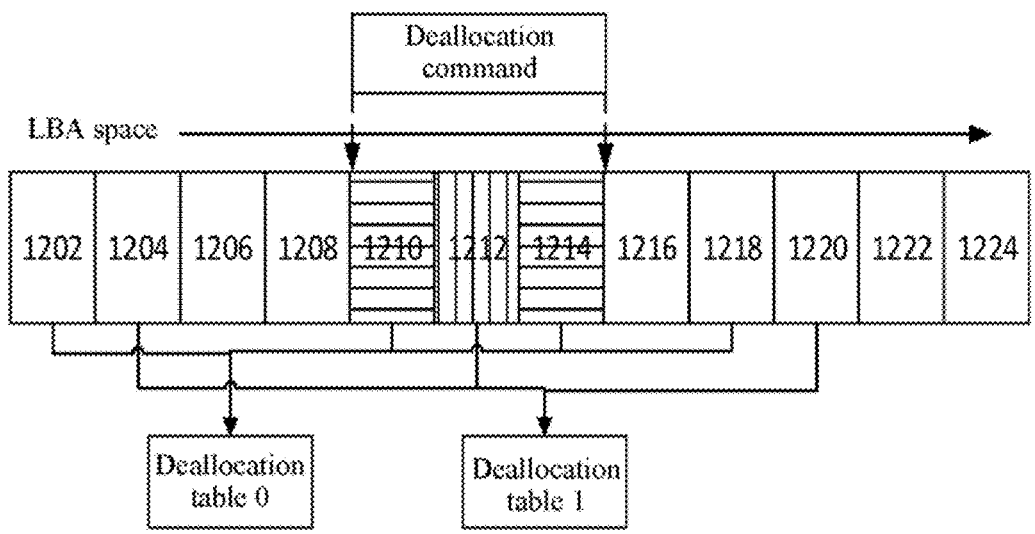
FIG. 12 is a schematic diagram of mapping between logical addresses accessed by IO commands and deallocation tables according to another embodiment of the present application.

FIG. 12 is a schematic diagram of mapping between logical addresses accessed by IO commands and deallocation tables according to another embodiment of the present application. In FIG. 12, a logical address space is divided into multiple areas (1202, 1204 . . . , 1224, etc.) along the direction in which logical address is incremented, and each area is mapped to one of multiple deallocation tables (deallocation table 0 and deallocation table 1).

In the embodiment of FIG. 12, each logical address area is mapped to one of the deallocation tables in turn. For example, areas 1202, 1206, 1210, 1214, and 1218 are mapped to deallocation table 0, and areas 1204, 1208, 1212, 1216, and 1220 are mapped to deallocation table 1. In this way, the logical address space accessed by a deallocation command from a host is mapped to each deallocation table as uniform as possible. The size of each logical address area is configurable. For example, each logical address area has the same size as a logical address range indicated by each FTL entry, such as 4 KB.

It can be understood that the logical address space can also be divided in other ways. For example, the logical address space is divided into areas of the same number as the deallocation tables, and each area is mapped to one deallocation table.

In another example, there are, for example, four deallocation tables. The logical address areas are mapped to one of the four deallocation tables in turn. For example, modulo operation is performed on 4 by a logical address, and the result is taken as an index of the deallocation table to which the logical address is mapped.

Continuing referring to FIG. 12, as an example, the deallocation command indicates that logical address areas 1210, 1212, and 1214 are deallocated. Logical address areas 1210 and 1214 are mapped to deallocation table 0, and logical address area 1212 is mapped to deallocation table 1. The deallocation command is provided to CPU 0 and CPU 1, CPU 0 accesses deallocation table 0 so that logical address areas 1210 and 1214 are deallocated, and CPU 1 accesses deallocation table 1 so that logical address area 1212 is deallocated.

Figure 13:
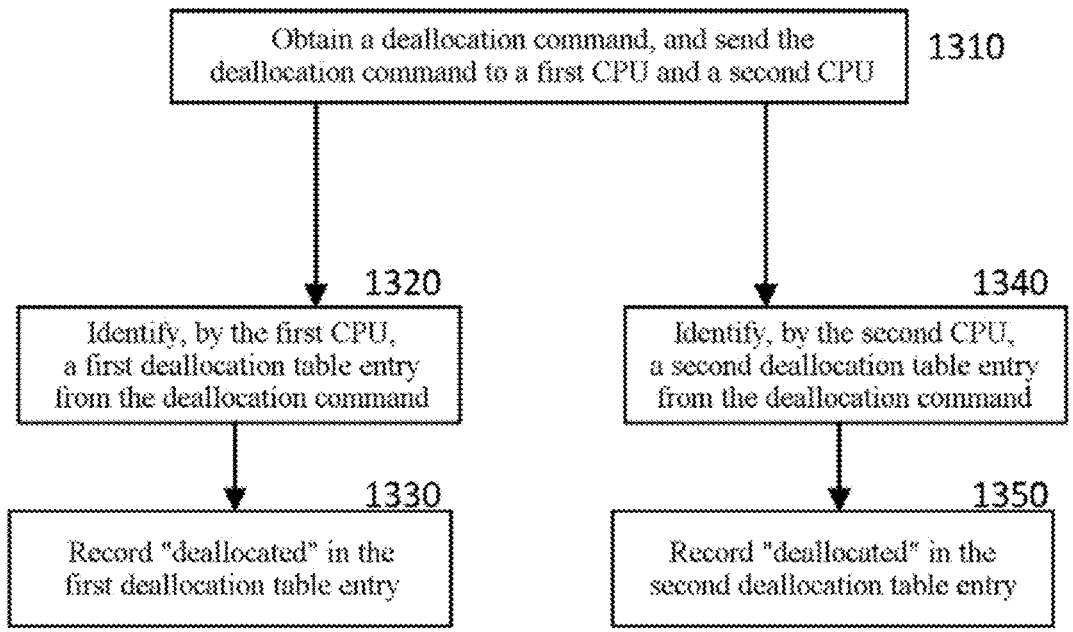
FIG. 13 is a flowchart of processing a deallocation command according to another embodiment of the present application.

FIG. 13 is a flowchart of processing a deallocation command according to another embodiment of the present application.

An allocator 630 (also referring to FIG. 11) sends a received deallocation command to CPU 0 and CPU 1 generally as the same time (1310). The deallocation command indicates a logical address to be deallocated. CPU 0 obtains, according to a logical address range indicated by the deallocation command, one or more logical addresses belonging to deallocation table 0 maintained by CPU 0 (1320), and updates deallocation table 0 according to these logical addresses, i. e., recording, in deallocation table 0, that these logical addresses are deallocated (1330). CPU 1 obtains, according to the same logical address range indicated by the deallocation command, one or more logical addresses belonging to deallocation table 1 maintained by CPU 1 (1340), and updates deallocation table 1 according to these logical addresses, i. e., recording, in deallocation table 1, that these logical addresses are deallocated (1350).

CPU 0 and CPU 1 cooperatively process different logical addresses of the same deallocation command, thereby accelerating the processing process for the deallocation command.

It can be understood that if a control component has more CPUs for processing the deallocation command, the same deallocation command is sent to the multiple CPUs; and each CPU maintains its own deallocation table, and marks, in the deallocation table, according to the logical address of its own deallocation table, that the logical address is deallocated.

Figure 14:
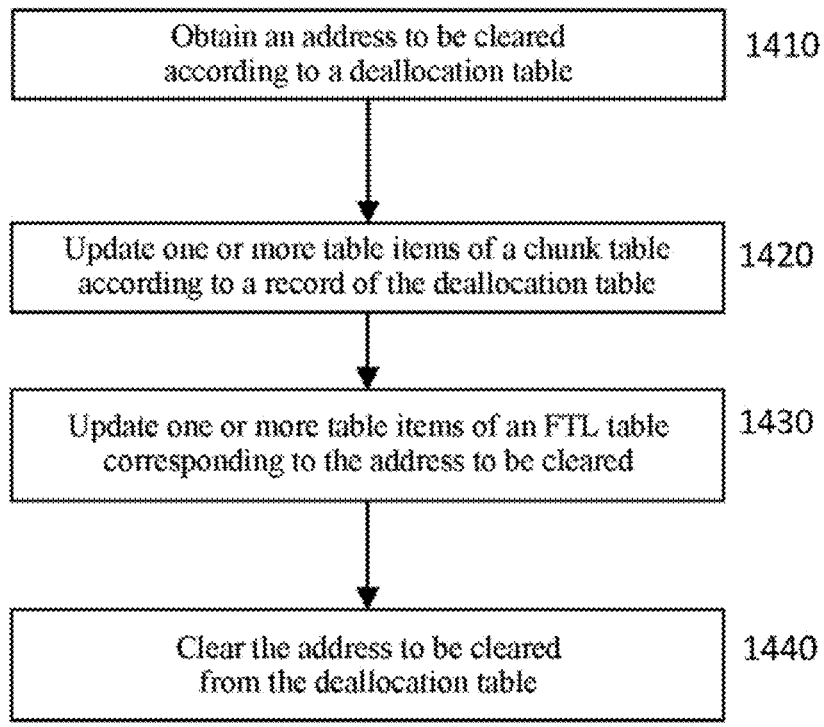
FIG. 14 is a flowchart of updating an FTL table according to a deallocation table according to another embodiment of the present application.

FIG. 14 is a flowchart of updating an FTL table according to a deallocation table according to another embodiment of the present application.

A deallocation table is used for temporarily recording that a logical address is "deallocated", so as to accelerate the processing for a deallocation command. A "deallocated" mark recorded in the deallocation table also needs to be transferred to an FTL table. Still taking CPU 0 as an example, whether at least one entry in deallocation table 0 is marked with "deallocated" is determined; and CPU 0 checks the deallocation table in due time to find an entry marked with "deallocated", records, in the FTL table, according to the found entry, that a corresponding logical address is "deallocated", and clears the "deallocated" mark of the entry in the deallocation table.

Referring to FIG. 14, for example, CPU 0 (also referring to FIG. 11) traverses deallocation table 0 to find one entry marked with the "deallocated" mark, obtains a corresponding logical address according to the position of the entry, and records the logical address as a logical address to be cleared (1410). Optionally, CPU 0 obtains multiple logical addresses to be cleared from deallocation table 0 at a time.

CPU 0 further updates one or more entries of a chunk descriptor table (1420). An FTL table is accessed according to one or more logical addresses to be cleared, and physical addresses corresponding to the logical addresses to be cleared are obtained, so as to identify chunks to which these physical addresses belong. A valid data amount recorded in a chunk descriptor is updated according to the number of deallocated physical addresses in a chunk. For example, if five physical addresses corresponding to five of ten logical addresses to be cleared belong to chunk 1, data recorded in the five physical addresses in chunk 1 is not valid any more.

CPU 0 further updates FTL table items corresponding to the logical addresses to be cleared in the FTL table, and records, in the FTL table items, that the logical addresses are "deallocated" (1430). Further, the "deallocated" marks are cleared in deallocation table entries corresponding to the logical addresses to be cleared in the deallocation table (1440).

For example, CPU 0 repeats the flow shown in FIG. 14 until that deallocation table 0 has no entry marked with "deallocated"; and corresponding check mark 0 is also cleared. It can be understood that CPU 1 executes a similar process shown in FIG. 14 according to deallocation table 1.

If the check mark is cleared, when processing a read command or a write command, there is no need to access a deallocation table, thereby accelerating the processing for the read command or the write command. If the check mark is set, when processing the read command or the write command, the deallocation table may need to be accessed to check whether the accessed logical address is deallocated.

A control component further executes a garbage collection process to release a storage space occupied by invalid data. As an example, also referring to FIGS. 3A and 3B, after executing the deallocation command, data stored on physical addresses 1-4, 3-6, 1-9, and 1-10 corresponding to logical addresses 0 to 3 becomes invalid. Physical block 1 can be collected, invalid data recorded on physical addresses 1-4, 1-9, and 1-10 is discarded, and valid data on physical block 1 is transferred to a new physical block, so as to release the storage space occupied by the invalid data of physical block 1.

According to embodiments of the present application, one or more chunks are selected according to the chunk descriptor table as chunks collected in the garbage collection process. For example, a chunk having the minimum valid data amount recorded in entries of the chunk descriptor table is selected as the chunk collected. In order to obtain the valid data amount of the chunk, after the deallocation command is processed, it is beneficial to update the valid data amount recorded in the entry of the chunk descriptor table by executing the flow shown by the embodiment of FIG. 14. In this way, the entry of the chunk descriptor table can embody the real valid data amount of the chunk.

Figure 15:
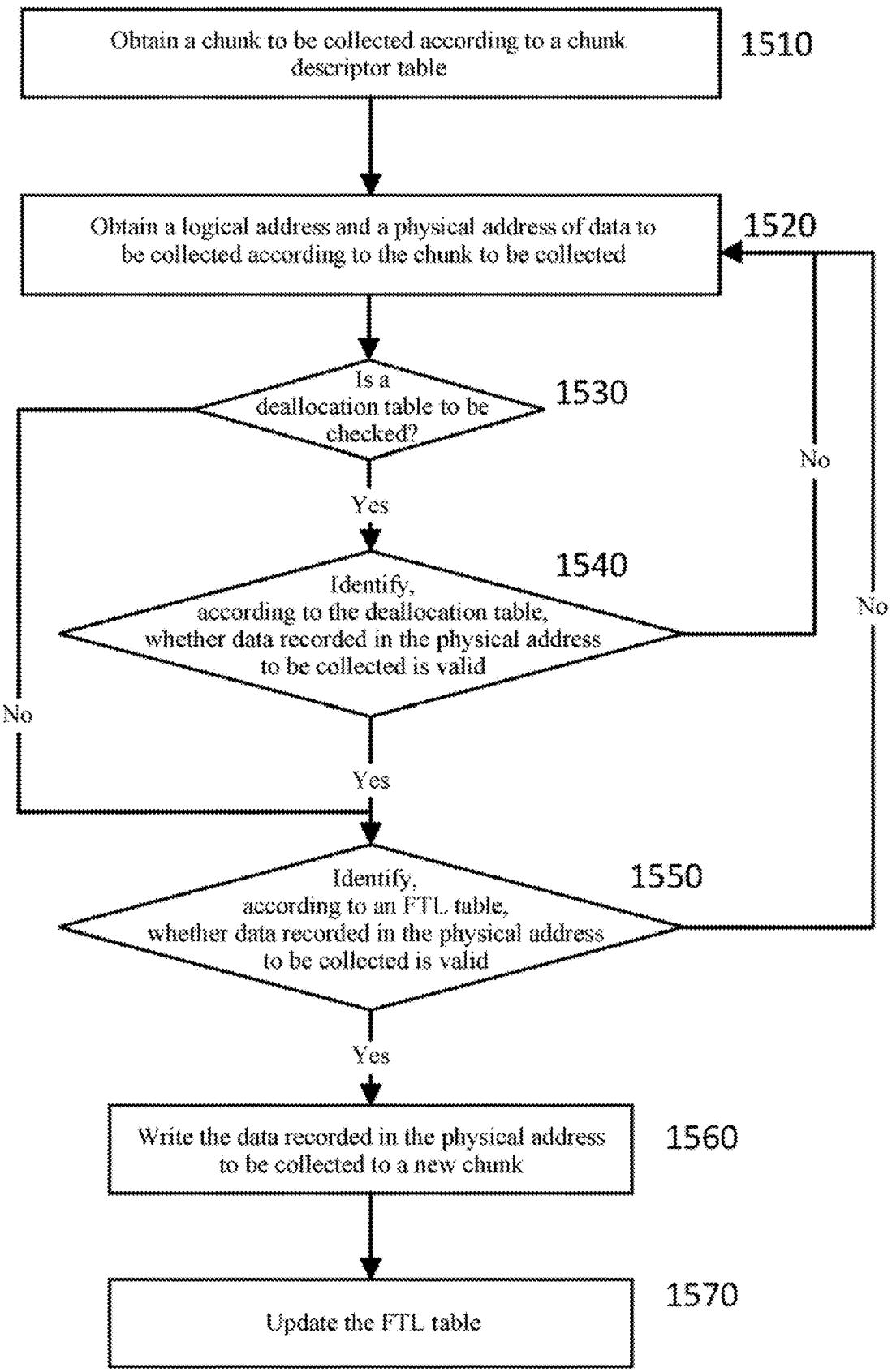
FIG. 15 is a flowchart of a garbage collection process according to another embodiment of the present application.

FIG. 15 is a flowchart of a garbage collection process according to another embodiment of the present application.

In order for garbage collection, a chunk to be collected is selected according to a chunk descriptor table (1510), for example, a chunk having the minimum valid data amount is selected. It can be understood that the valid data amount of the chunk recorded in the chunk descriptor table may not be a real valid data amount because the chunk descriptor table has not been updated through, for example, the flow according to the embodiment of FIG. 14.

A physical address and a logical address of data to be collected are obtained according to the chunk to be collected (1520). The physical address of the data to be collected is known during obtaining of the data to be collected, and the logical address of the data to be collected is obtained through a correspondence between the physical address and the logical address recorded in the chunk to be collected. In an optional implementation (different from FIG. 15), an FTL table is then directly queried through the logical address to obtain a recorded physical address, whether the data to be collected is valid is identified according to whether the recorded physical address is consistent with the physical address of the data to be collected, and only valid data is collected and invalid data is discarded.

Continuing referring to FIG. 15, whether a deallocation table is to be checked is identified according to a check mark (referring to FIG. 11, such as check mark 0 and check mark 1) (1530). If there is no need to check the deallocation table, the FTL table is then queried through the logical address to obtain the recorded physical address, and whether the data to be collected is valid is identified according to whether the recorded physical address is consistent with the physical address of the data to be collected (1550). For valid data to be collected, the valid data to be collected is written to a new chunk (1560), and then the FTL table is updated by using the new chunk (1570), i. e., recording a new storage position of the valid data to be collected in the FTL table.

At step 1530, if the deallocation table needs to be checked, the deallocation table is accessed according to the logical address of the data to be collected. If a corresponding entry of the deallocation table is recorded with "deallocated" (1540), it means that the logical address does not store valid data, and then return to step 1520 to obtain a logical address and a physical address of next data to be collected from the chunk to be collected. If no corresponding entry of the deallocation table is recorded with "deallocated", the FTL table is queried according to the logical address of the data to be collected so as to identify whether the data to be collected is valid (1550).

At step 1550, if the data to be collected is invalid, the invalid data is discarded and not collected, and return to step 1520 to obtain he logical address and the physical address of the next data to be collected from the chunk to be collected. If the data to be collected is valid, data recorded at the physical address of the data to be collected is written to the new chunk (1560), and the FTL table is updated on this bass (1570).

FIGS. 16A-16E show deallocation tables and check marks according to another embodiment of the present application.

A check mark records whether at least one entry in a corresponding deallocation table is marked with "deallocated", also records a start position (S), the current position (C), and an end position (E) of current check for the deallocation table, and optionally records a start position (NS) and an end position (NE) of next check for the deallocation table.

Figure 16A:
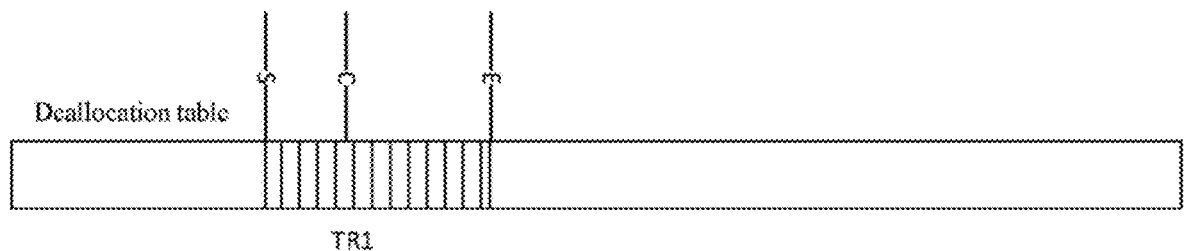
FIGS. 16A-16E are schematic diagrams for the correspondence between a deallocation table and a check mark according to another embodiment of the present application.

Referring to FIG. 16A, for example, deallocation table 0 is shown. CPU 0 processes a deallocation command (TR1), and entries in a dash part of the deallocation table are set as "deallocated"; and deallocation table 0 is checked or cleared, so as to transfer the "deallocated" marks in the deallocation table to an FTL table. S indicates the start position of the current check, E indicates the end position of the current check, and C indicates the position of the current check. It can be understood that the start position S and the end position E are obtained according to a range indicated by the deallocation command (TR1). The entries of the deallocation table are checked or cleared one by one through the flowchart shown by FIG. 9 from the start position S to the end position E, and C indicates the position of the current check.

Figure 16B:
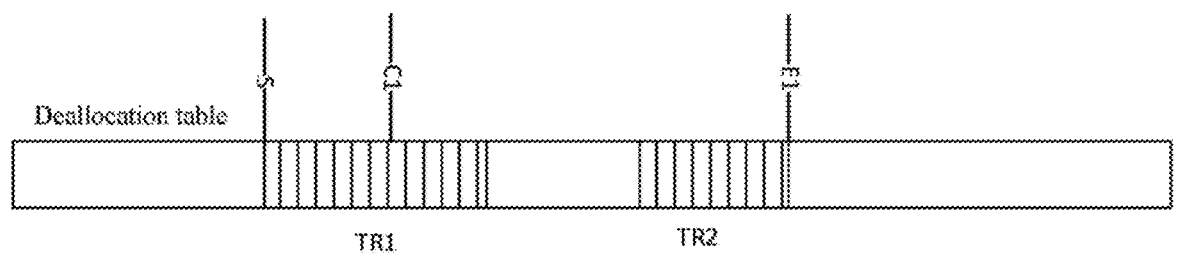

Referring to FIG. 16B, during check from start position S to end position E shown in FIG. 16A, CPU 0 further receives a deallocation command TR2. The dash part corresponding to TR2 in FIG. 16B indicates the part of a range indicated by the deallocation command TR2 in deallocation table 0. According to embodiments of the present application, since the part of the range indicated by the deallocation command TR2 in deallocation table 0 is completely after the range of the current check (from start position S to end position E) in a logical address space, it is only necessary to update the end position recorded in a check mark from E to E1 (the end position of the part of the ranged indicated by TR2 in deallocation table 0). The position of the current check is C1. According to FIG. 16B, the check for deallocation table 0 will continue from the current position C1 to the end position E1, and the start position S is not updated. Although in FIG. 16B, some areas between the dash parts indicated by the deallocation commands TR1 and TR2 are not marked as "deallocated" areas, for the sake of simplicity, these areas are also cleared. If it is found during check that these areas are not marked as "deallocated", then skip directly and check the next entry of deallocation table 0.

Figure 16C:
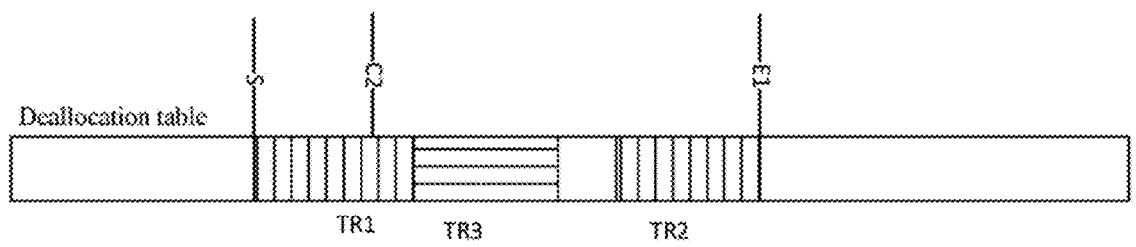

Referring to FIG. 16C, during check from start position S to end position E1 shown in FIG. 16B, CPU 0 further receives a deallocation command TR3. The horizontal dash part corresponding to TR3 in FIG. 16C indicates the part of a range indicated by the deallocation command TR3 in deallocation table 0. According to embodiments of the present application, since the part of the range indicated by the deallocation command TR3 in deallocation table 0 overlaps with the part of the range indicated by the deallocation command TR1 in deallocation table 0, the start of the part of an area indicated by the deallocation command TR3 in deallocation table 0 is within the range indicated by the deallocation command TR1, and the end of the part of the area indicated by the deallocation command TR3 in deallocation table 0 is after the part of the range indicated by the deallocation command TR1 in deallocation table 0. The position of the current check is C2. Since the start and the end of the part of the area indicated by the deallocation command TR3 in deallocation table 0 are both between the current position C2 and the end position E1, there is no need to update the start position S and the end position E1 after receiving the command TR3.

As another example, if the start of the part of a range indicated by a deallocation command TR3' (not shown) in deallocation table 0 is after the start position S, the end of the range is before the end position E1, and the range covers the current position C2, it means that a deallocation table entry checked or cleared in a part between the start of the part of the range indicated by the deallocation command TR3' in deallocation table 0 and the current position C2 is updated again. In this case, a check mark further records that a start position NS of next scanning is the start position of the part of the range indicated by the deallocation command TR3' in deallocation table 0, and an end position NE of the next check is the current position C2.

Figure 16D:
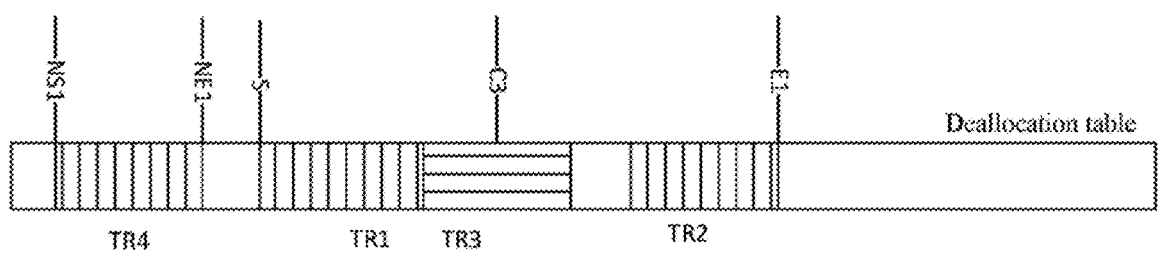

Referring to FIG. 16D, during check from start position S to end position E1 shown in FIG. 16C, CPU 0 further receives a deallocation command TR4. The dash part corresponding to TR4 in FIG. 16D indicates the part of a range indicated by the deallocation command TR4 in deallocation table 0. According to embodiments of the present application, the start of the part of an area indicated by the deallocation command TR4 in deallocation table 0 is before the start of the range indicated by the deallocation command TR1, and the end of the part of the area indicated by the deallocation command TR4 in deallocation table 0 is before the range indicated by the deallocation command TR1. The position of the current check is C3. Since the start and the end of the part of the area indicated by the deallocation command TR4 in deallocation table 0 are both before the current position C3, it means that a deallocation table entry in the range indicated by the deallocation command TR4 has been updated, and thus needs to be checked or cleared. In this case, a check mark further records that the start position of next scanning is a start position NS1 of the deallocation command TR4, and the end position of next check is an end position NE1 of the deallocation command TR4.

Figure 16E:
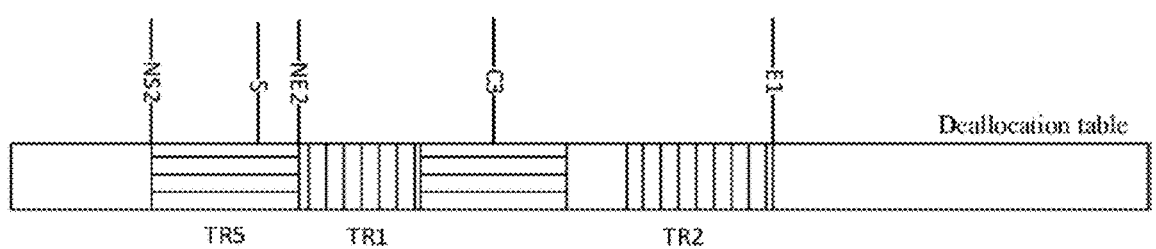

Referring to FIG. 16E, during check from start position S to end position E1 shown in FIG. 16C, CPU 0 further receives a deallocation command TR5. The dash part corresponding to TR5 in FIG. 16E indicates the part of a range indicated by the deallocation command TR5 in deallocation table 0. According to embodiments of the present application, the start of the part of an area indicated by the deallocation command TR5 in deallocation table 0 is before the start of the range indicated by the deallocation command TR1, and the end of the part of the area indicated by the deallocation command TR5 in deallocation table 0 is within the range indicated by the deallocation command TR1. The position of the current check is C3. Since the start and the end of the area indicated by the deallocation command TR5 are both before the current position C3, it means that a deallocation table entry in the part of the range indicated by the deallocation command TR5 in deallocation table 0 has been updated, and thus needs to be checked or cleared. In this case, a check mark further records that the start position of next scanning is a start position NS2 of the deallocation command TR5, and the end position of next check is an end position NE2 of the deallocation command TR5.

In the examples according to FIGS. 16D and 16E, since the start position and the end position of next check are set, after the check or clear of the deallocation table from the start position S to the end position E1 has been completed, it will continue to check or clear the deallocation table according to the start position NS1 or NS2 and the end position NE1 or NE2 of next check.

Figure 17:
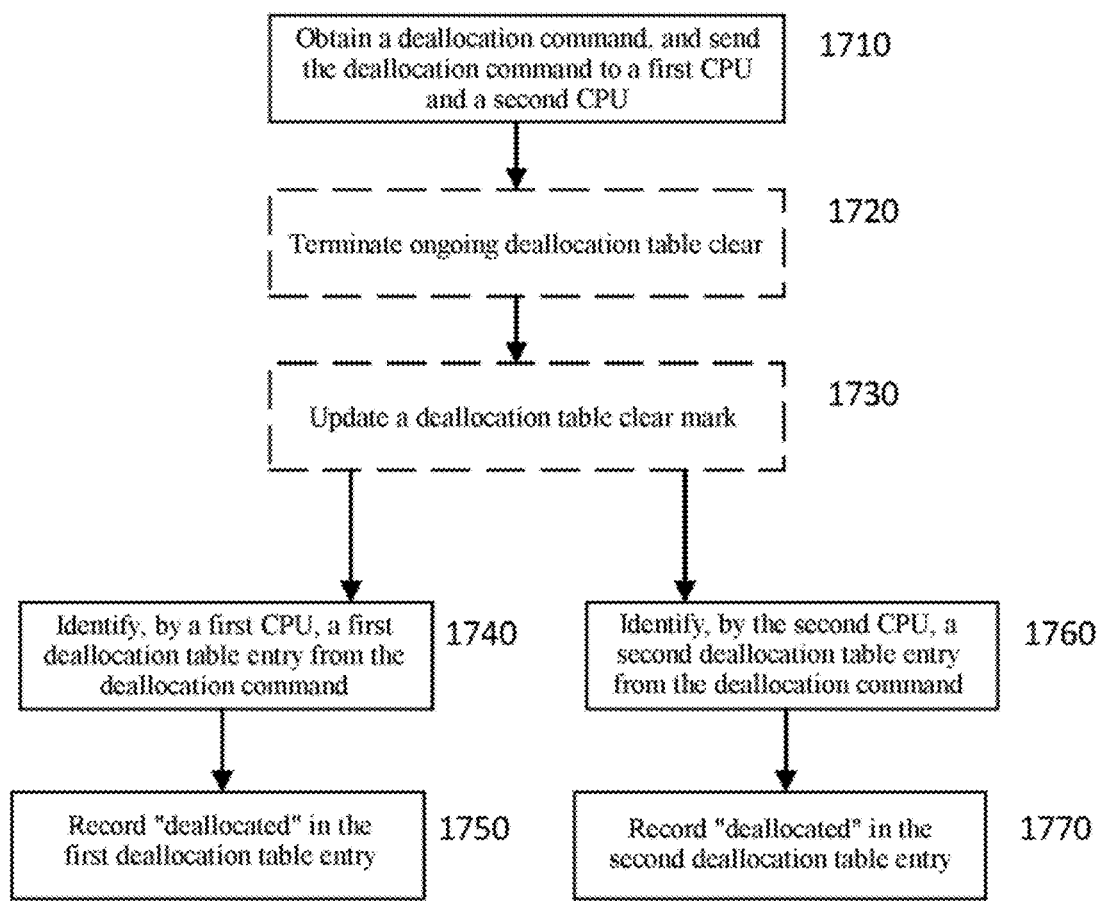
FIG. 17 is a schematic diagram of processing a deallocation command according to another embodiment of the present application.

FIG. 17 is a schematic diagram of processing a deallocation command according to another embodiment of the present application.

An allocator 1130 (also referring to FIG. 11) receives a deallocation command, and sends the received deallocation command to CPU 0 and CPU 1 generally as the same time (1710). Optionally, in response to receiving the deallocation command, CPU 0 and CPU 1 terminate check or clear operations which are being performed by CPU 0 and CUP 1 for a deallocation table (if the check or clear for the deallocation table is being performed) (1720).

According to embodiments of the present application, when CPU 0 and CPU 1 are idle, CPU 0 and CPU 1 check or clear deallocation tables that they are responsible for maintaining. Moreover, when a new deallocation command is received, the ongoing check or clear for the deallocation table is suspended, and the deallocation command is processed immediately to accelerate the processing of the deallocation command and reduce the delay in processing the deallocation command.

Still optionally, according to the received deallocation command, (if necessary) CPU 0 and CPU 1 further update check marks (check mark 0 and check mark 1) respectively maintained by CPU 0 and CPU 1 (1730). The check mark is updated according to the ways shown in FIGS. 16A-16E, so as to record, in the check mark, the end position of the current check or clear for the deallocation table, and optionally, the start position and the end position of the next round of check or clear for the deallocation table.

Next, CPU 0 obtains, according to a logical address range indicated by the deallocation command, one or more logical addresses belonging to deallocation table 0 maintained by CPU 0 (1740), and updates deallocation table 0 according to these logical addresses, i. e., recording, in deallocation table 0, that these logical addresses are deallocated (1750). CPU 1 obtains, according to the same logical address range indicated by the deallocation command, one or more logical addresses belonging to deallocation table 1 maintained by CPU 1 (1760), and updates deallocation table 1 according to these logical addresses, i.e., recording, in deallocation table 1, that these logical addresses are deallocated (1770).

Figure 18:
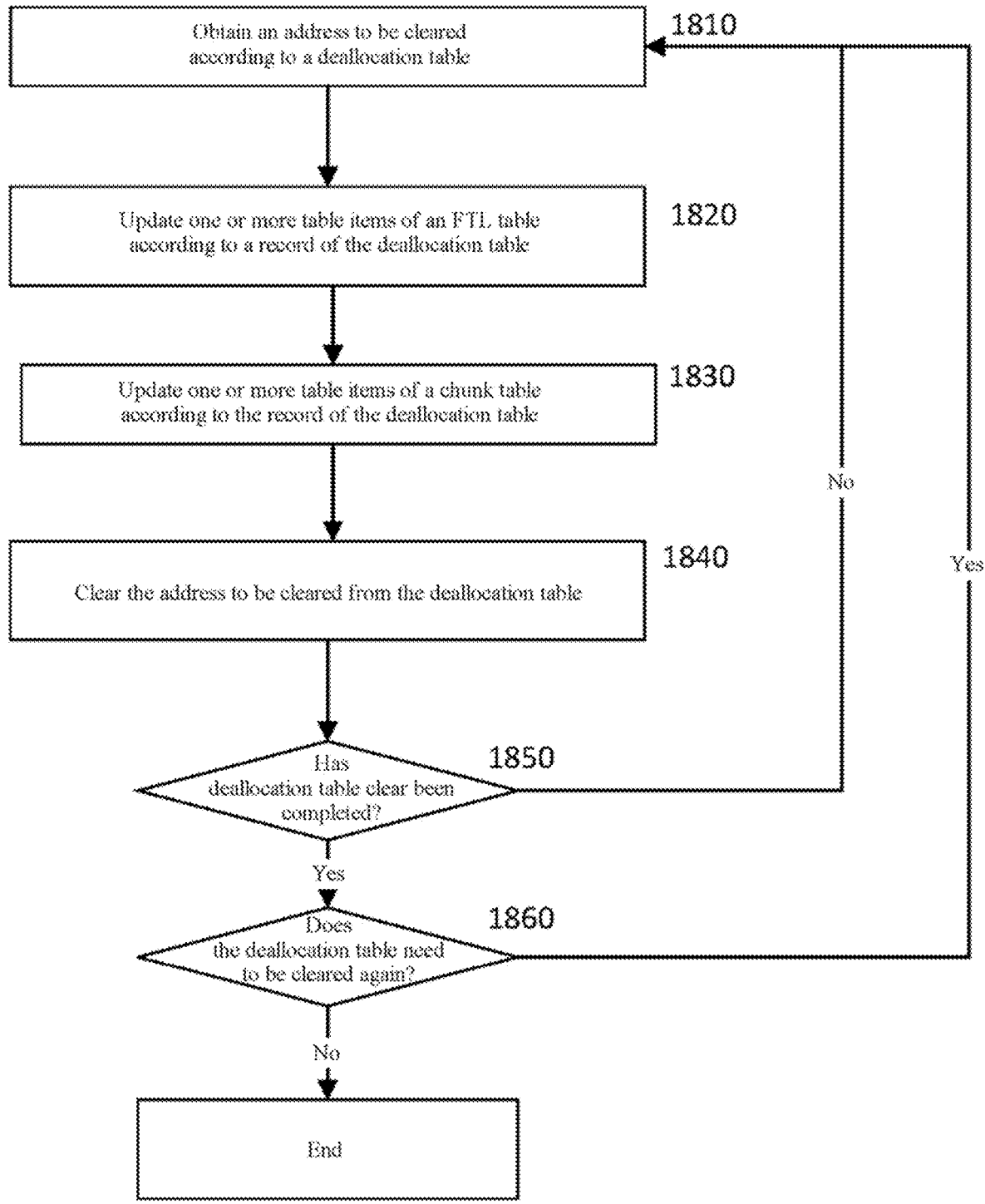
FIG. 18 is a flowchart of updating an FTL table according to a deallocation table according to another embodiment of the present application.

FIG. 18 is a flowchart of updating an FTL table according to a deallocation table according to another embodiment of the present application.

Still taking CPU 0 as an example, whether at least one entry in deallocation table 0 is marked with "deallocated" is determined; and CPU 0 checks the deallocation table in due time to find a table item marked with "deallocated" (1810), records, in an FTL table, according to the found table item, that a corresponding logical address is "deallocated" (1820), and clears the "deallocated" mark of the entry in the deallocation table (1840). CPU 0 further updates a chunk descriptor table (1830). The execution order of step 1830 and step 1840 is not limited. For example, CPU 0 traverses deallocation table 0 to find one table item recorded with the "deallocated" mark, obtains a corresponding logical address according to the position of the table item, and records the logical address as a logical address to be cleared. Optionally, CPU 0 obtains multiple logical addresses to be cleared from deallocation table 0 at a time.

When the FTL table is updated, according to one or more logical addresses to be cleared, physical addresses corresponding to the logical addresses to be cleared are obtained from the FTL table, so as to identify chunks to which these physical addresses belong. A valid data amount recorded in a chunk descriptor is updated according to the number of deallocated physical addresses in a chunk. CPU 0 further updates FTL table items corresponding to the logical addresses to be cleared in the FTL table, and records, in the FTL table items, that the logical addresses are "deallocated". Further, the "deallocated" marks are cleared in deallocation table items corresponding to the logical addresses to be cleared in the deallocation table.

CPU 0 identifies whether check or clear for deallocation table 0 has been completed (1850). Whether the check or clear for the deallocation table has been completed is determined by comparing the end position recorded in the check mark with the current position of checking or clearing the deallocation table. If the current position does not reach the end position, it means that the deallocation table further has a table item to be checked or cleared. If deallocation table 0 has been checked or cleared, return to step 1810 to check the deallocation table and find the table item marked with "deallocated".

If the deallocation table has been checked or cleared (the current position reaches the end position), whether the deallocation table needs to be checked or cleared again is further checked (1860). Whether to further scan or clear the allocation table is determined by identifying whether the start position and the end position of next scanning are recorded in the check mark. If the start position and the end position of next scanning are recorded in the check mark, proceed to step 1810 to start a new round of check or clear for the deallocation table from the start position of next scanning. If the start position and the end position of next scanning are not recorded in the check mark, the check or clear for the deallocation table by the CPU has been completed.

According to embodiments of the present application, each CPU executes the flow shown in FIG. 18 for the deallocation table that the CPU is responsible for maintaining. Each CPU processes the update for the FTL table in parallel according to the deallocation table, thereby accelerating the processing process.

Figure 19:
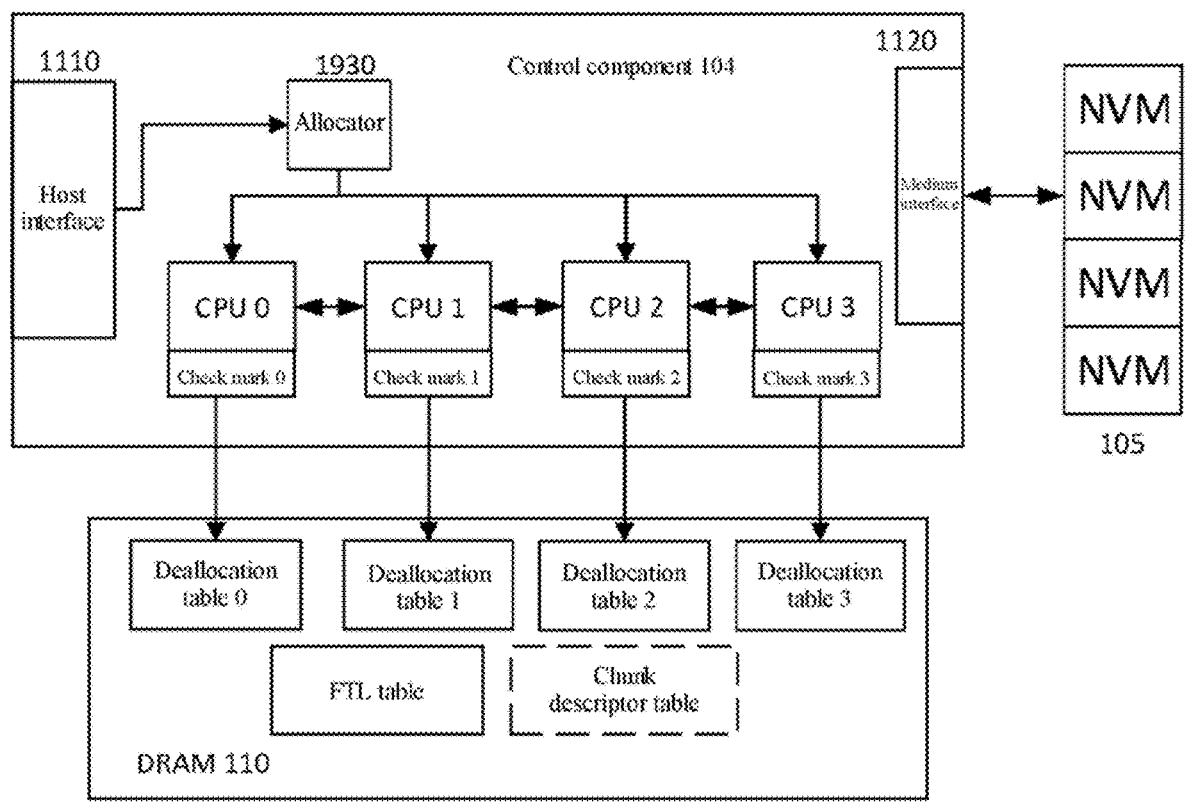
FIG. 19 is a block diagram of a control component according to another embodiment of the present application.

FIG. 19 is a block diagram of a control component according to another embodiment of the present application. A control component shown in FIG. 19 has a structure similar to that of the control component shown in FIG. 11. Exemplarily, the control component 104 includes multiple CPUs, and an allocator 1930 allocates an OI command to each of the multiple CPUs. The control component of FIG. 19 includes four CPUs (CPU 0, CPU 1, CPU 2, and CPU 3). The processing process of the IO command by the control component 104 is similar to that by the control component 104 in FIG. 11. The IO command is allocated to multiple CPUs.

A deallocation table is divided into four parts (deallocation table 0, deallocation table 1, deallocation table 2, and deallocation table 3). CPU 0 maintains deallocation table 0, CPU 1 maintains deallocation table 1, CPU 2 maintains deallocation table 2, and CPU 3 maintains deallocation table 3. For example, modulo operation is performed on 4 by a logical address, and the result is taken as an index of the deallocation table of the logical address.

Continuing referring to FIG. 19, for the deallocation command, the allocator 1930 provides the deallocation command to CPU 0, CPU 1, CPU 2, and CPU 3 at the same time. CPU 0 processes the part of the deallocation command that is maintained by deallocation table 0, CPU 1 processes the part of the deallocation command that is maintained by deallocation table 1, CPU 2 processes the part of the deallocation command that is maintained by deallocation table 2, and CPU 3 processes the part of the deallocation command that is maintained by the deallocation table 3. Therefore, CPU 0, CPU 1, CPU 2, and CPU 3 process the same deallocation command at the same time, thereby accelerating the processing process for the deallocation command.

Regarding IO commands, the IO commands associated with different parts of an FTL table can be processed by different CPUs. The allocator 1930 allocates the IO command to CPU 0, CPU 1, CPU 2, OR CPU 3 according to the logical address accessed by the IO command. CP U 0, CPU 1, CPU 2, and CPU 3 process multiple IO commands in parallel.

The deallocation table temporarily records that the logical address is in a "deallocated" state. CPU 0, CPU 1, CPU 2, or CPU 3 further checks the deallocation table, updates a corresponding table item of the FTL table according to a deallocation table item recorded with the "deallocated" state, and records the "deallocated" state in the FTL table item. A check mark for indicating that the deallocation table is to be checked or check has not been completed is also recorded. Check mark 0 maintained by CPU 0 indicates whether deallocation table 0 needs to be checked or that check has not been completed, and check mark 1 maintained by CPU 1 indicates whether deallocation table 1 needs to be checked or that check has not been completed. Check mark 2 maintained by CPU 2 indicates whether deallocation table 2 needs to be checked or that check has not been completed, and check mark 3 maintained by CPU 3 indicates whether deallocation table 3 needs to be checked or that check has not been completed.

Check mark 0, check mark 1, check mark 2, and check mark 3 at least indicate whether at least one entry in respective deallocation tables is marked with "deallocated".

In still optional implementation, CPU 0 can update deallocation table 0 but cannot update deallocation table 1, deallocation table 2, and deallocation table 3. CPU 1 can update deallocation table 1 but cannot update deallocation table 0, deallocation table 2, and deallocation table 3. CPU 2 can update deallocation table 2 but cannot update deallocation table 0, deallocation table 1, and deallocation table 3. CPU 3 can update deallocation table 3 but cannot update deallocation table 0, deallocation table 1, and deallocation table 2. CPU 0, CPU 1, CPU 2, and CPU 3 each can read all deallocation tables.

Still as an example, the check mark maintained by each of multiple CPUs also indicates the start position (S), the current position (C), and the end position (E) of the current check for the deallocation table maintained by the CPU, and optionally also records the start position (NS) and the end position (NE) of the next check.

The descriptions above are only specific implementations of the present application. However, the scope of protection of the present application is not limited thereto. Within the technical scope disclosed by the present application, any variation or substitution that can be easily conceived of by those skilled in the art should all fall within the scope of protection of the present application. Therefore, the scope of protection of the present application should be determined by the scope of protection of the appended claims.

The invention claimed is:

1. A method for processing a deallocation command, comprising the following steps:
    sending a received deallocation command to multiple CPUs;
    obtaining, by each CPU, one or more addresses belonging to a deallocation table maintained by the CPU from an address range indicated by the deallocation command, and updating, according to the one or more addresses, the deallocation table maintained by the CPU, so that the one or more addresses are recorded as "deallocated" in the deallocation table;
    updating, by a CPU, according to the received deallocation command, a check mark maintained by the CPU, wherein the check mark indicates whether at least one entry in the deallocation table is marked with "deallocated";
    updating, by the CPU, according to the address range indicated by the deallocation command, table items of an FTL table, wherein the FTL table records a physical address corresponding to a logical address; and
    after the address recorded by the marked table item in the FTL table is deallocated, clearing the "deallocated" mark of the table item of the deallocation table,
    wherein the deallocation command is provided to each or more of the multiple CPUs at the same time, and the multiple CPUs process the deallocation command in parallel, and
    an IO command is randomly allocated to different CPUs for processing.

2. The method for processing the deallocation command according to claim 1, wherein in response to receiving a read command, in response to the check mark of the deallocation table being set, the CPU accesses the deallocation table to check whether an address accessed by the read command is deallocated, in response to the check mark of the deallocation table being not set, the CPU queries the FTL table to obtain an address, and reads data from the address as a response to the read command.

3. The method for processing the deallocation command according to claim 2, further comprising:
    in response to garbage collection going to be performed, selecting a chunk to be collected;
    obtaining, according to the chunk to be collected, an address of data to be collected; and
    in response to the deallocation table needing to be checked, accessing the deallocation table according to the address of the data to be collected, and in response to a corresponding table item of the deallocation table being marked with deallocated, obtaining, from the chunk to be collected, a next data to be collected.

4. The method for processing the deallocation command according to claim 3, further comprising:
    in response to the corresponding table item of the deallocation table being not marked with "deallocated", querying the FTL table according to the address of the data to be collected so as to identify whether the data to be collected is valid; and in response to the data to be collected being valid, writing the data to be collected into a new chunk, and updating the FTL table.

5. The method for processing the deallocation command according to claim 4,
wherein the check mark records a start position, the current position, and an end position of check of the deallocation table;
wherein the check mark further records a start position and an end position of next check of the deallocation table;
the method further including: clearing the deallocation table according to the check mark;
wherein clearing the deallocation table includes: checking table items of the deallocation table one by one from the start position of the deallocation table to the end position of the deallocation table recorded in the check mark, in response to a table item being marked with "deallocated", updating a corresponding table item of the FTL table on this basis, recording a "deallocated" state in the table item of the FTL table, and clearing the "deallocated" state of the table item in the deallocation table.

6. The method for processing the deallocation command according to claim 5, further comprising:
during clearing the deallocation table, in response to a new deallocation command being received, in response to the start position and the end position of the new deallocation command being both after the end position recorded in the check mark, updating the end position in the check mark as the end position of the new deallocation command.

7. The method for processing the deallocation command according to claim 6, further comprising:
determining, by comparing the end position recorded in the check mark with the current position of clearing the deallocation table, whether clearing of the deallocation table is completed.

8. A method executed by a storage device, comprising:
receiving a read command;
in response to no entry in a deallocation table being marked with "deallocated", querying an FTL table to obtain a physical address corresponding to a logical address accessed by the read command;
obtaining data from the physical address as a response to the read command;
in response to at least one entry in the deallocation table being marked with "deallocated", querying the deallocation table to determine whether the logical address accessed by the read command is deallocated;
in response to the logical address accessed by the read command being marked with "deallocated" in the deallocation table, using a designated value as a response to the read command;
in response to the logical address accessed by the read command being not marked with "deallocated" in the deallocation table, using the data obtained according to the physical address obtained by querying the FTL table, as a response to the read command;
in response to receiving a write command, allocating a physical address for the write command;
in response to no entry in the deallocation table being marked with "deallocated", updating the FTL table with a logical address of the write command and the allocated physical address; and writing data according to the physical address;
in response to at least one entry in the deallocation table being marked with "deallocated", clearing the "deallocated" mark of an entry corresponding to the logical address of the write command in the deallocation table;
the deallocation table comprises a first deallocation table and a second deallocation table, respectively corresponding to a first FTL table and a second FTL table;
a state of the first deallocation table indicates whether any entry in the deallocation table including the first deallocation table and the second deallocation table is marked with "deallocated"; and
a state of the second deallocation table indicates whether any entry in the deallocation table including the first deallocation table and the second deallocation table is marked with "deallocated".

9. The method according to claim 8, wherein a first CPU processes the deallocation command of accessing the first deallocation table; and a second CPU processes the deallocation command of accessing the second deallocation table.

10. A storage device, comprising a control component, a memory, and an NVM chip, wherein the memory stores a deallocation table and an FTL table, and the control component comprises a first CPU and a second CPU; and
the first CPU and the second CPU respectively execute the method according to claim 8.

* * * * *